United States Patent [19]

Lee

[11] Patent Number: 5,432,613

[45] Date of Patent: Jul. 11, 1995

[54] IMAGE DATA PROCESSING APPARATUS AND METHOD FOR PROCESSING IMAGE DATA

[75] Inventor: Yoon-Woo Lee, Suweon, Rep. of Korea

[73] Assignee: Samsung Electronics Co., Ltd., Rep. of Korea

[21] Appl. No.: 189,173

[22] Filed: Jan. 31, 1994

[30] Foreign Application Priority Data

Jan. 30, 1993 [KR] Rep. of Korea .................. 93-1213

[51] Int. Cl.⁶ .......................................... H04N 5/76
[52] U.S. Cl. ............................. 358/335; 360/8; 360/33.1; 358/336
[58] Field of Search ............ 358/335, 310, 336, 314; 360/9.1, 38.1, 33.1; H04N 5/76, 9/79

[56] References Cited

U.S. PATENT DOCUMENTS 4,882,732  11/1989  Kaminaga ................. 360/38.1
5,060,077  10/1991  Koya et al. ................. 358/335
5,179,451  1/1993   Takeshita et al. .......... 358/335

Primary Examiner—Tommy P. Chin
Assistant Examiner—Khoi Truong
Attorney, Agent, or Firm—Antonelli, Terry, Stout & Kraus

[57] ABSTRACT

A method and apparatus for recording and/or reproducing digital image data is disclosed which are compressed by an interleaving process using a logic product code. The method comprises the steps of receiving the digital image data corresponding to one frame; converting the digital image data into a plurality of outer codes and a plurality of inner codes, each of the outer codes having an image information data block and a first additional information data block, and each of the inner code having the image information data block and a second additional information data block; generating a plurality of logic code blocks composed of the outer and inner codes, each of the logic code blocks being used as an error correction code block; dividing each of the logic code blocks into a first storing information portion and a second storing information portion, the first storing information portion having the image information data block and the second additional information data block and the second storing information portion having the first additional information data block and the second additional information data block; and recording the first storing information portion on a middle portion in each track on a recording tape and recording the second storing information portion only top and bottom portions in each track.

3 Claims, 27 Drawing Sheets

| MPB0-1 |
|---|
| MPB1-1 |
| ⋮ |
| MPB14-1 |
| MPB15-1 |
| MPB0-2 |
| MPB1-2 |
| ⋮ |
| MPB12-29 |
| MPB13-29 |
| MPB14-29 |
| MPB15-29 |

| MPB0-30 |
|---|
| MPB1-30 |
| ⋮ |
| MPB15-54 |
| PB0-1 |
| PB1-1 |
| PB2-1 |
| ⋮ |
| PB12-4 |
| PB13-4 |
| PB14-4 |
| PB15-4 |

OUTER CODE

INNER CODE

1 ECC BLOCK (IMAGE INFORMATION BLOCK)

(ADDITIONAL INFORMATION BLOCK PB0)

PB15

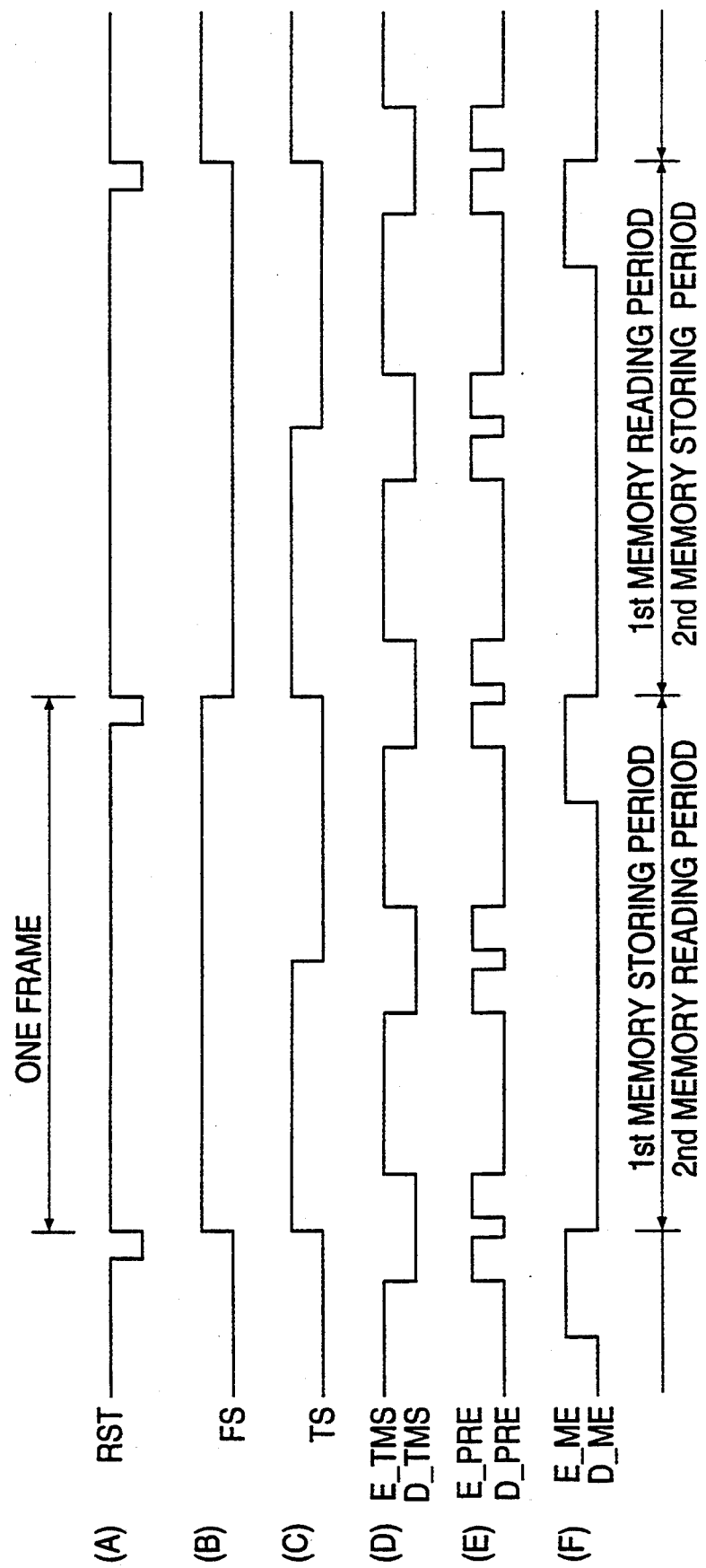

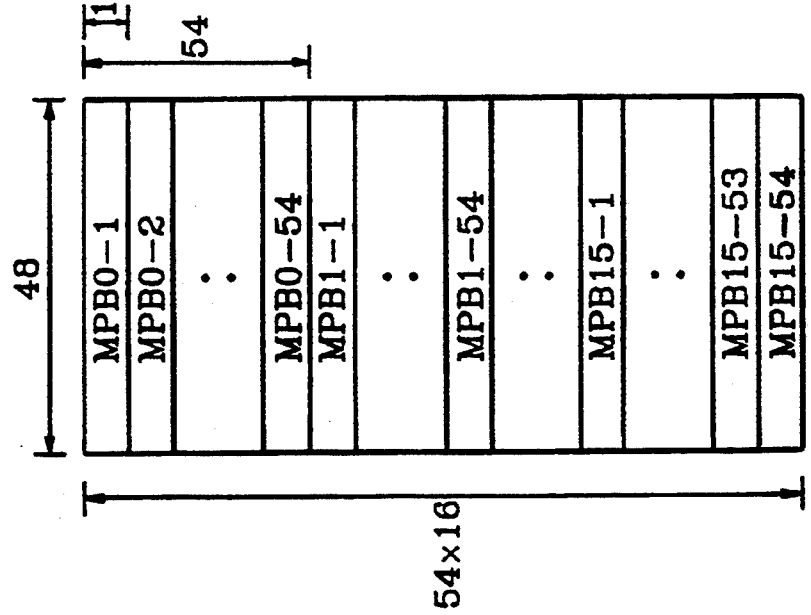
FIG. 18
FIG. 17
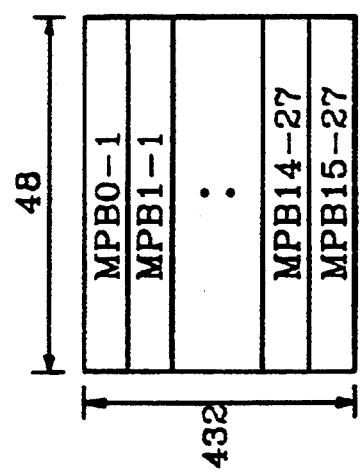
FIG. 16

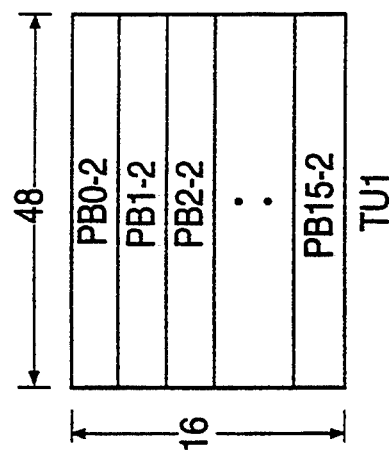
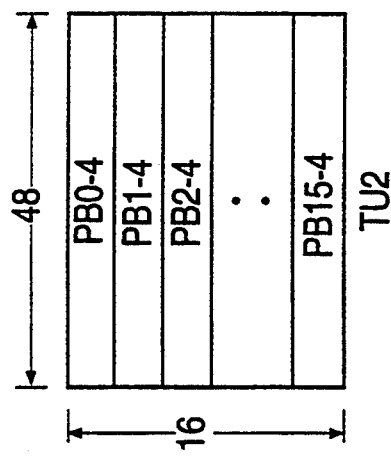
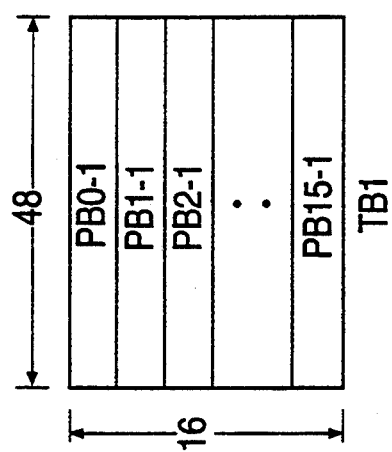
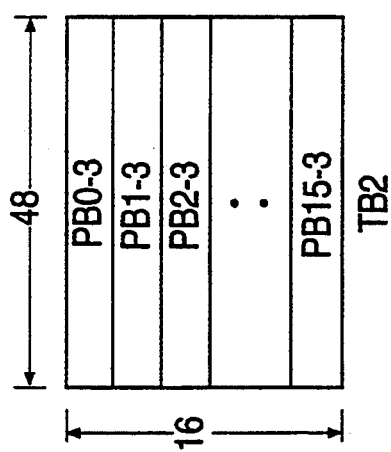
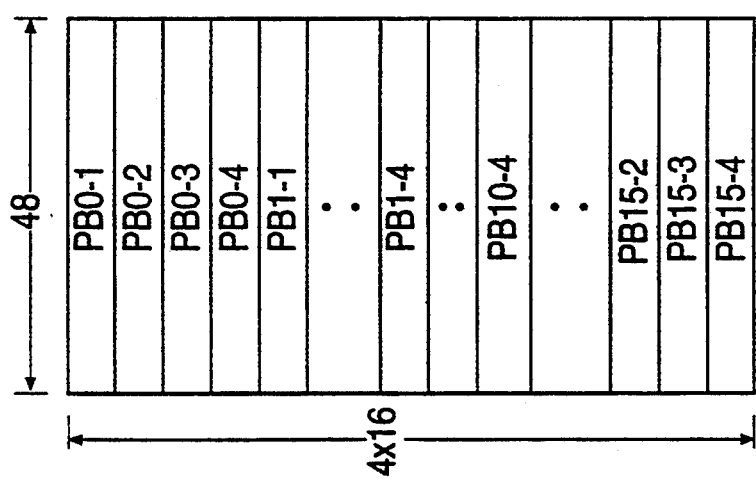

IMAGE DATA PROCESSING APPARATUS AND METHOD FOR PROCESSING IMAGE DATA

BACKGROUND OF THE INVENTION

1. Field of the Invention

The present invention relates to an image data processing apparatus for a digital video tape recorder (hereinafter, referred to as "digital VTR") in which image data as much as possible can be reproduced from a recording medium in order that image quality can be further improved, and a method for processing image data therein.

2. Description of the Prior Art

Generally, a digital VTR for recording and reproducing image data by using a well-known digital signal processing method in the art has variety and many advantages in function, but has a problem that an amount of data to be processed therein is much larger as compared to an analog VTR widely-known for home use.

Accordingly, since a digital VTR for home use has to be able to use a magnetic tape for an analog VTR, which has been widely used at home, to record and reproduce image data on the magnetic tape, the image data has to be compressed to reduce the amount of the image data to be processed.

Also, when image data are recorded and reproduced, errors occur inevitably. If the image data are recorded and reproduced by compression, image damage due to the errors is serious, compared to the recording and reproducing of the image data without compression. Errors generated during reproducing of image data should be reduced as much as possible and such a digital VTR can reproduce image data at high speed as with the analog VTR.

The two subjects as described above can be solved by an error correction coding (hereinafter, referred to as "ECC") method and a tape formatting method.

In the ECC method, in order to effectively correct a random error and a burst error generated during recording or reproducing operation, an outer ECC process and an inner ECC process are performed so that a logic product code is generated, and then an interleaving process is performed using the logic product code. Accordingly, the random error can be corrected by the inner and outer ECC processes, and the burst error is converted into a random error that can be corrected.

Since the interleaving method is related to a tape format in which image data are recorded on a magnetic tape having a predetermined pattern, the tape format has an important effect upon image quality when a reproducing operation is performed with a change of speed in a digital VTR.

FIG. 1 is a plane view of a tape showing a scanning path of a head during reproducing operation of double speed in a tape format in which image data of one frame are divided and recorded in two tracks, and FIG. 2 is a plane view of a tape showing a scanning path of a head during reproducing operation at three times speed.

In FIGS. 1 and 2, portions indicated by broken lines are ones to be scanned by the head and portions indicated by hatching are ones to have been reproduced by the head. A part of image data reproduced from only the hatched portions of each track is useful as correct data.

When the reproducing operation is performed at a normal speed, image data recorded in all portions of each track are reproduced, but when the reproducing operation is performed at a high speed, image data recorded in only a portion of each track are reproduced as shown in the hatched portion of FIG. 2. As described above, reproducing of a part of the image data has a bad influence upon image quality.

Particularly, if image data reproduced from only a part of each track are reconstructed in the home digital VTR capable of compressing and reproducing of image data, loss of image data is substantially increased as compared to reproducing of image data without compression. For this reason, even though the reproducing operation at high speed is performed using the interleaving process and the tape formatting process, it has to be considered that image data as much as possible can be reproduced from a recording medium. Also, even in a broadcasting VTR in which image data are not compressed to be recorded and reproduced, the image data are recorded on several tracks of a magnetic tape in random so that good image quality can be obtained during reproducing operation at high speed.

However, in the home VTR in which image data are compressed to be recorded and reproduced, the image data are divided into a plurality of segments to be recorded and reproduced. Then, the image data are compressed substantially by recording in the middle portion of a recording tape, and the recorded image data are reproduced from the middle portion during the reproducing operation at high speed so that data reproduction at high speed can be performed.

Generally, an ECC method is used to correct errors generated during the reproducing operation, and preferable the tape formatting method of the conventional methods as described above is that image data are transformed to a logic product code to be recorded on a recording tape at random or in a segment. In this method, outer codes not to be used in the reproducing operation are encoded by an outer encoding process to be transformed to additional information. The additional information are encoded by an inner encoding process to be transformed to further additional information. The information formed thus are recorded on the recording tape at random or in a segment.

Therefore, for image data reproduced during reproducing operation at high speed, outer decoding data necessary for performing the outer decoding process are reproduced together with the image data. If inner decoding data necessary for performing the inner decoding process in place of the outer decoding data are reproduced, image quality can be further improved.

In FIG. 6, a conventional tape format of data in two fields of one frame are respectively recorded in two tracks T1 and T2 is shown. An example of the data format to be recorded in accordance with the conventional tape format is illustrated in FIGS. 3 to 5.

As seen above, when the reproducing operation at high speed is performed since data recorded in the upper and bottom portions of each track except for the middle portion of each track are not reproduced and the reproducing head scans along two tracks simultaneously, the reproduced data amplified by an amplifying are not accurately reproduced.

SUMMARY OF THE INVENTION

Accordingly, it is an object of the present invention to provide an image data processing apparatus for a digital VTR and a method for processing image data in order that image quality can be improved even for reproducing operation at high speed.

It is another object of the present invention to provide a method for formatting a recording tape so as to improve image quality during reproducing operation at high speed.

BRIEF DESCRIPTION OF THE DRAWINGS

This invention may be better understood and its objects and advantages will become apparent to those skilled in the art by reference to the accompanying drawings as follows:

FIG. 15 is a timing chart showing waveforms of control signals for storing image data in a memory and reading out from the memory;

FIG. 16 is a diagram showing a data structure of image information of one frame which is stored in the memory;

FIG. 17 is a diagram showing the data structure of the image information which are stored on a first track TM1 of the tape as shown in FIG. 13;

FIG. 18 is a diagram showing the data structure of the image information which are stored on a second track TM2 of the tape as shown in FIG. 13;

FIG. 19 is a diagram showing a data structure of the additional information portion of one frame which are stored in the memory;

FIGS. 20A and 20B are data structures showing the additional information portion which are stored on bottom and upper portions TB1 and TU1 of the first track, respectively, as shown in FIG. 13;

FIG. 21A and 21B are data structures showing the additional information which are stored on bottom and upper portions TB2 and TU2 of the second track, respectively;

DESCRIPTION OF THE PREFERRED EMBODIMENTS

Figure 1:
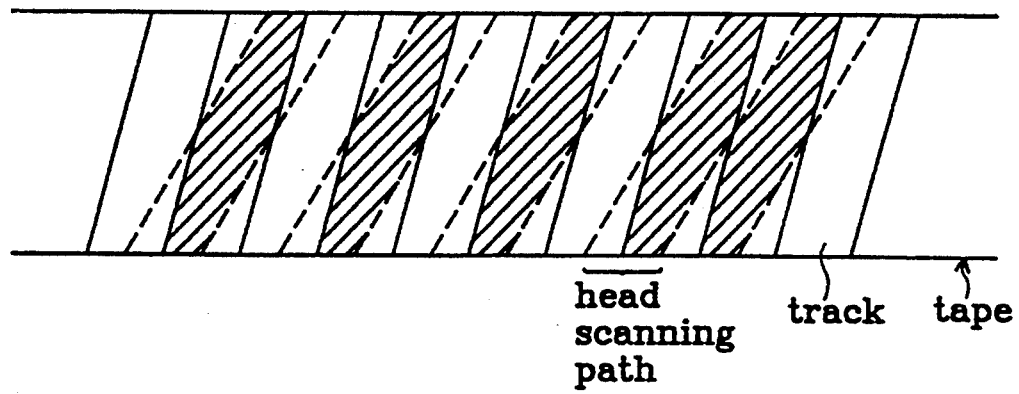
FIG. 1 is a plane diagram of a tape showing a scanning path of a head during a reproducing operation at double speed.
Figure 2:
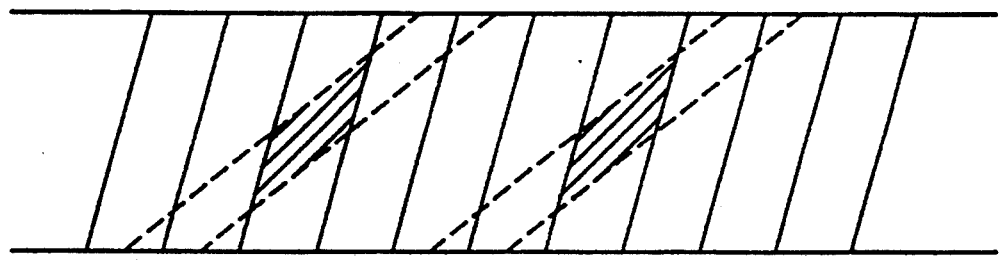
FIG. 2 is a plane diagram of a tape showing a scanning path of a head during a reproducing operation at triple speed.
Figure 3:
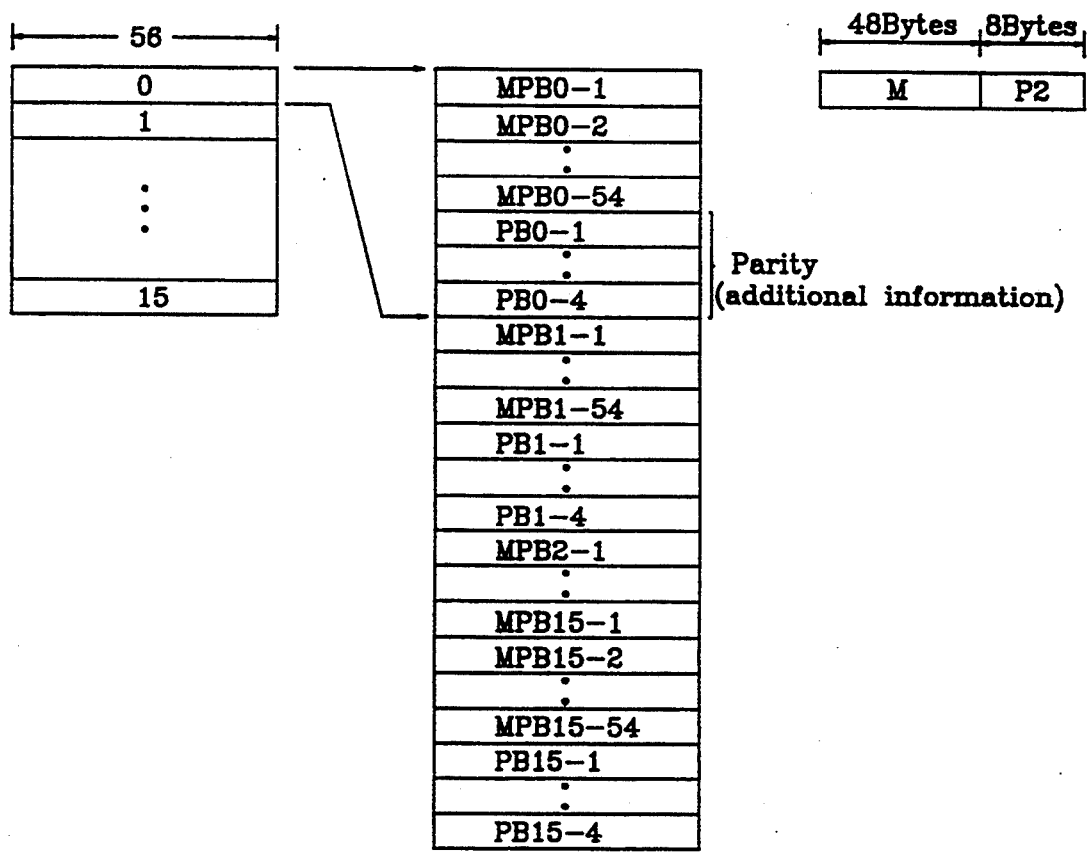
FIG. 3 is a diagram showing a data format according to an embodiment of an conventional technique.
Figures 4, 5, 6:
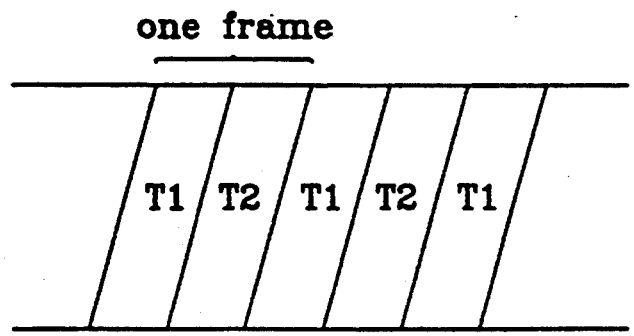
FIG. 4 is a diagram showing a data structure of one track T1 of two tracks corresponding to image data of one frame in a tape format of the conventional technique.
FIG. 5 is a diagram showing a data structure of the other track T2 of the two tracks in a tape format of the conventional technique.
FIG. 6 is a diagram showing a tape format of the conventional technique.
Figure 7:
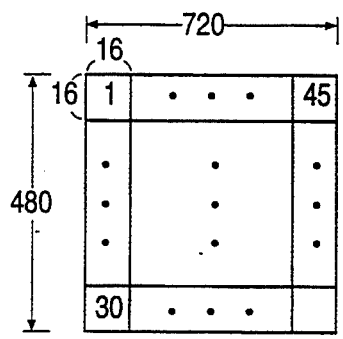
FIG. 7 is a diagram showing a data structure of image data of one frame to be formed by sampling in an NTSC broadcasting system.
Figure 8A:
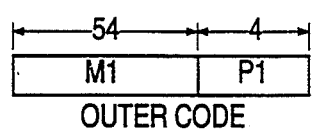
FIGS. 8A and 8B are diagrams showing data structures of outer and inner codes according to an embodiment of the present invention, respectively.
Figure 8B:
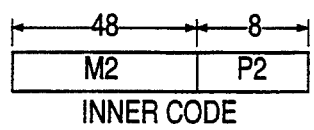

Referring now to FIG. 7, sampled image data corresponding to an picture in an NTSC broadcasting system are illustrated which are comprised of a plurality of blocks, each of the blocks being comprised of 16×16 pixels in row and column directions. For example, one frame is comprised of 1350 blocks which are compressed by a data compressor. Image data compressed thus are converted into code blocks, which are shown in FIGS. 8A and 8B, by means of an outer encoding method and an inner encoding method. An outer code as shown in FIG. 8A is represented by (58, 4), and an inner code as shown in FIG. 8B is represented by (56, 8).

Figure 9:
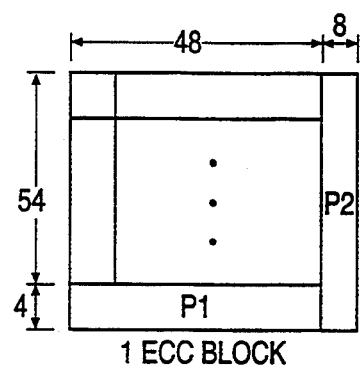
FIG. 9 is a diagram showing a data structure of one error correction coding block according to an embodiment of the present invention.
Figure 10A:
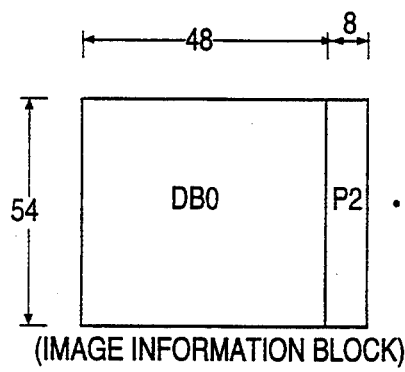
FIG. 10 is a diagram showing a block structure of image information and additional information of one frame according to an embodiment of the present invention.
Figure 10B:
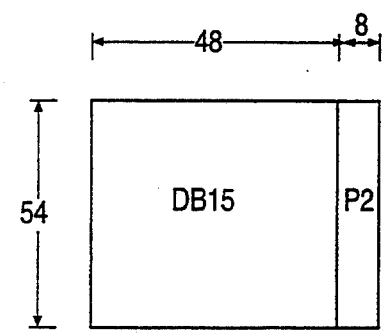
Figure 10C:
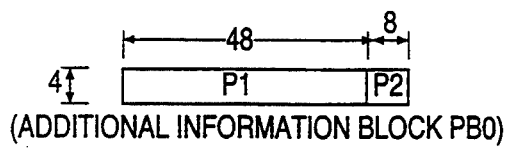
Figure 10D:
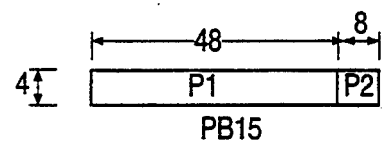

With reference to FIG. 9, a logic product code block which is comprised of the outer and inner codes is illustrated. The logic product code block is an error correction code block (hereinafter, referred to as "ECC block") which has fifty four unit blocks and four additional information blocks, each unit block having 48 symbols and each additional information block being added to each unit block in the column direction thereof by the outer encoding. Sixteen ECC blocks correspond to one frame. In the ECC code block, there are two types of data, one of which is a first additional information portion P1 to be added to the image information by means of the outer encoding method, and the other of which is a second additional information portion P2 to be added to the first information by means of the inner encoding method.

Figure 11:
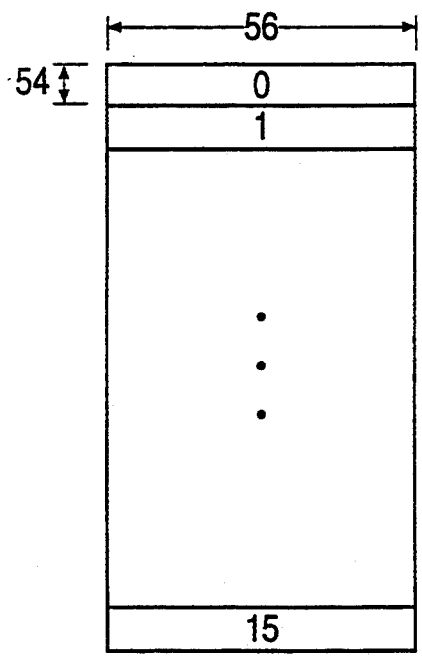
FIG. 11 is a diagram showing a block structure of the image information portion of one frame.
Figure 12:
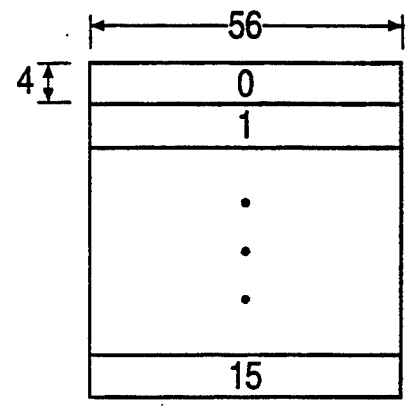
FIG. 12 is a diagram showing the block structure of the additional information portion of one frame.

As described above, in each of the ECC code blocks, the two types of information are represented as one map as shown in FIGS. 11 and 12. In FIG. 11, a block structure of the image information of one frame are shown as a map of a memory, and in FIG. 12 a block structure of the additional information of one frame are shown as a map of the memory. According to the present invention, the additional information P1 and P2 are recorded on the both sides of each track in a recording magnetic tape.

Figure 13:
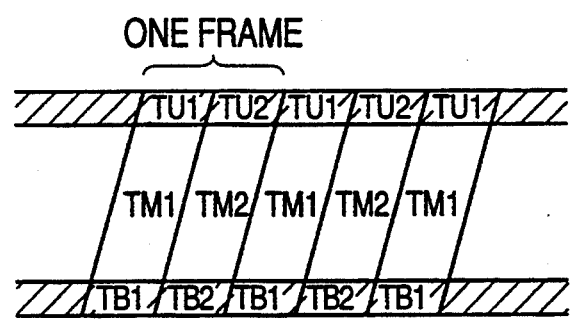
FIG. 13 is a diagram showing a tape format according to the present invention.

An example of tape format according to the present invention is illustrated in FIG. 13. In FIG. 13, reference symbols TM1 and TM2 indicate middle portions of the tape in which the image information and the second additional information to be added to the image information are recorded. Reference symbols TU1 and TU2 indicate upper portions of the tape in which the first additional information portion and the second additional information to be added to the first additional information are recorded, and reference symbols TB1 and TB2 indicate bottom portions of the tape in which the same information as the information to be recorded in the upper portions TU1 and TU2 are recorded.

Hereinafter, operation of formatting the recording tape will be described with reference to the accompanying drawings.

Figure 14:
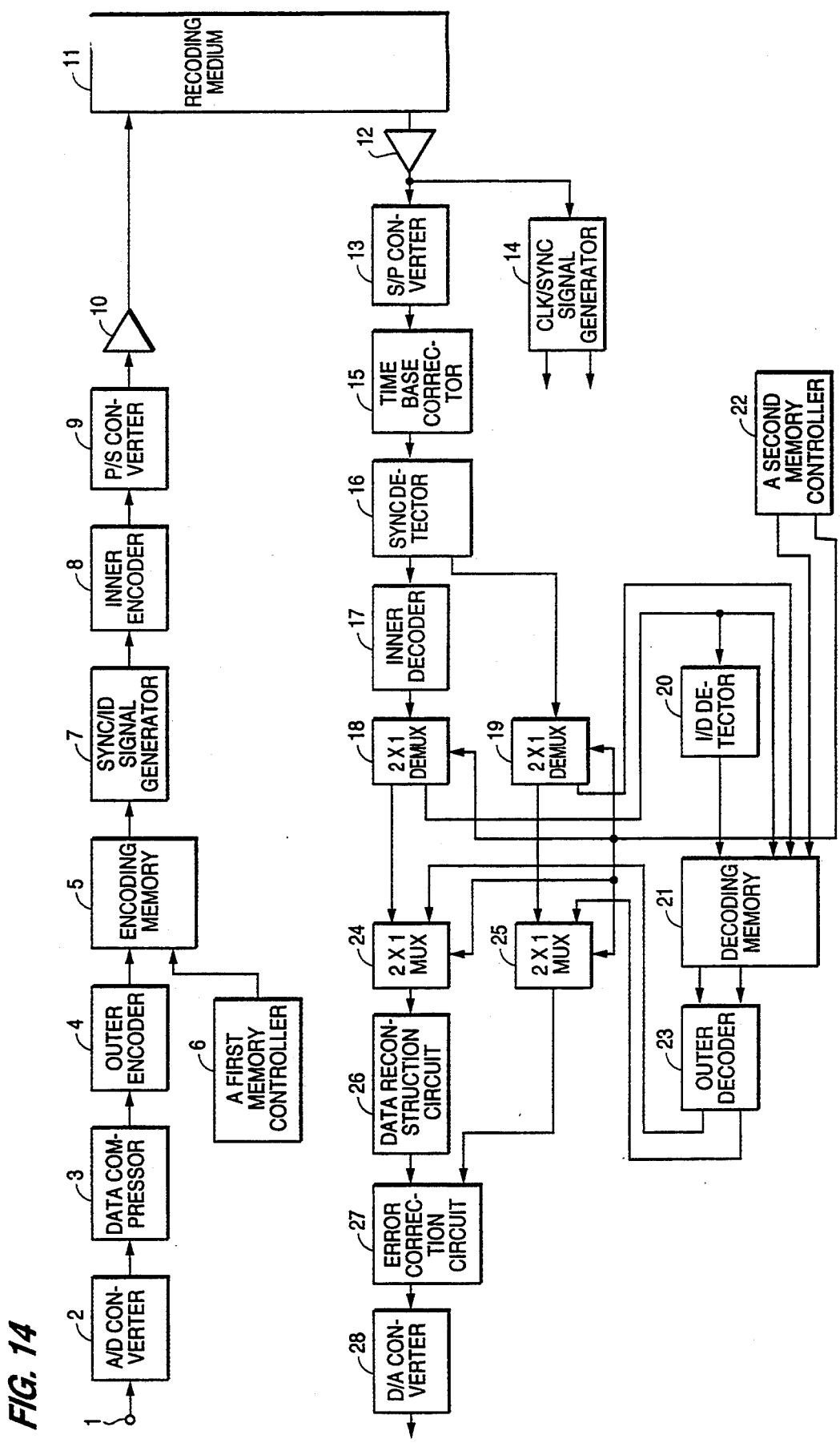
FIG. 14 is a circuit block diagram showing the construction of a digital image data processing apparatus according to an embodiment of the present invention.

FIG. 14 is a circuit diagram showing the image data processing apparatus according to the present invention, which has an encoding unit and a decoding unit. FIG. 15 is a timing diagram of control signals for storing and reading out the image data in the image data processing apparatus as shown in FIG. 14.

The tape formatting according to the present invention as illustrated in FIG. 13 is performed in a first memory 5 and a first memory controller 6 of the encoding unit, and a second memory 21 and a second memory controller 22 of the decoding unit in the apparatus.

First, a data processing method will be described in which an analog image signal is encoded to be recorded in a recording medium 11 which is a magnetic tape.

In FIG. 14, the analog image signal from an input terminal 1 is applied to an analog to digital converter 2 (hereinafter, referred to as "A/D converter") to be converted digital image data. The digital image data are applied to a data compressor 3 to be compressed, and then the compressed image data are applied to an outer encoder 4. With the outer encoder 4, the compressed image data are divided into a plurality of outer codes which are respectively added with first additional information, and then all the outer codes added with the first additional information are stored in an interleaving memory (not shown) and a formatting memory (not shown) which are located in an encoding memory 5. The encoding memory 5 has storage capability for storing image data corresponding to two frames and is operated by control signals, for example memory enable signal E_ME, memory write enable signals E_MWE and /E_MWE, and other control signals shown in FIG. 15, FIG. 22, or FIG. 23. In memory 5 the image data corresponding to one frame are divided into the image information and the additional information, and are stored in a first memory portion (not shown) of the encoding memory 5.

Figure 24:
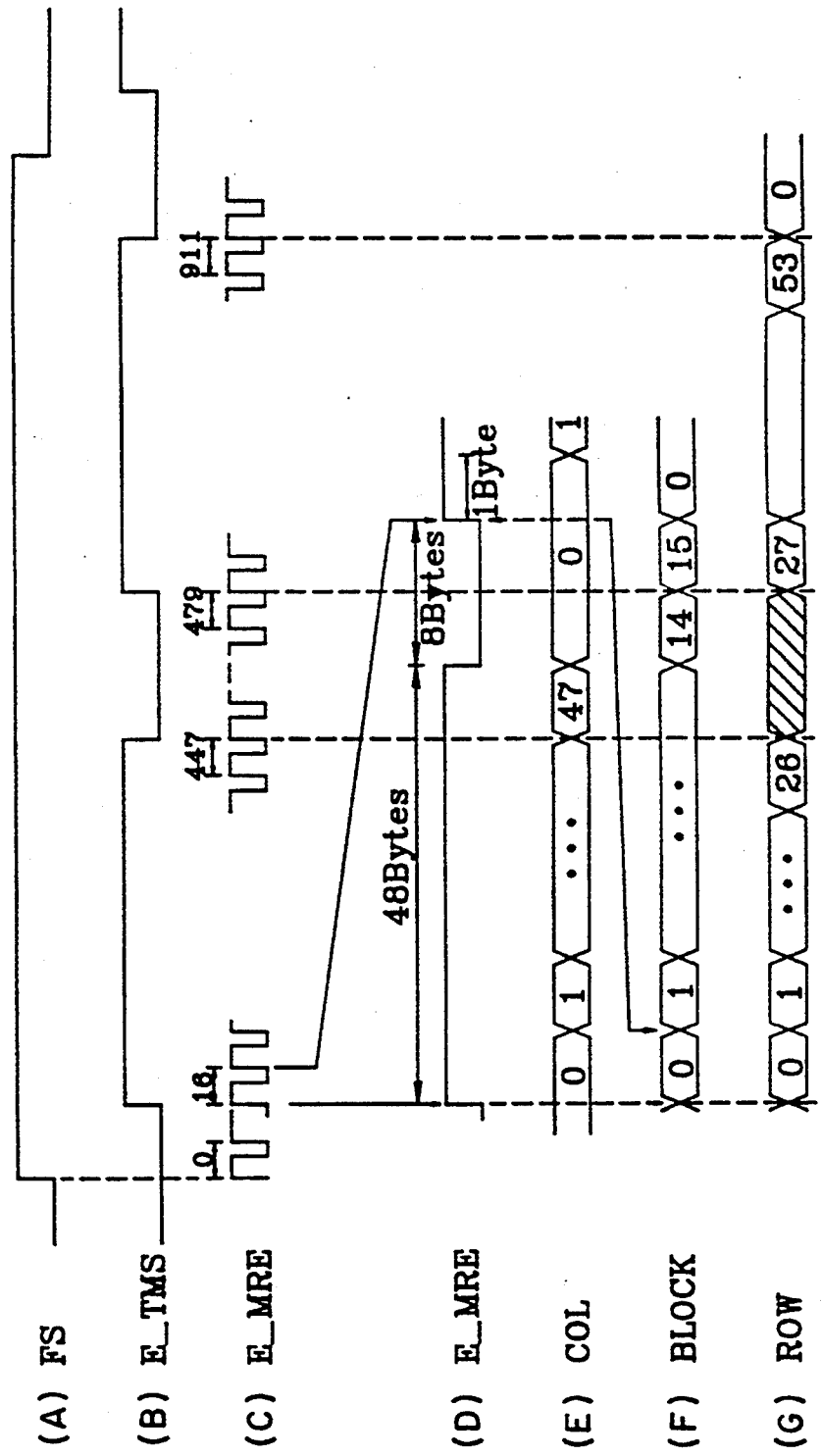
FIG. 24 is a timing chart of the control signals when the image information are read out from the encoding memory during the encoding operation.
Figure 25:
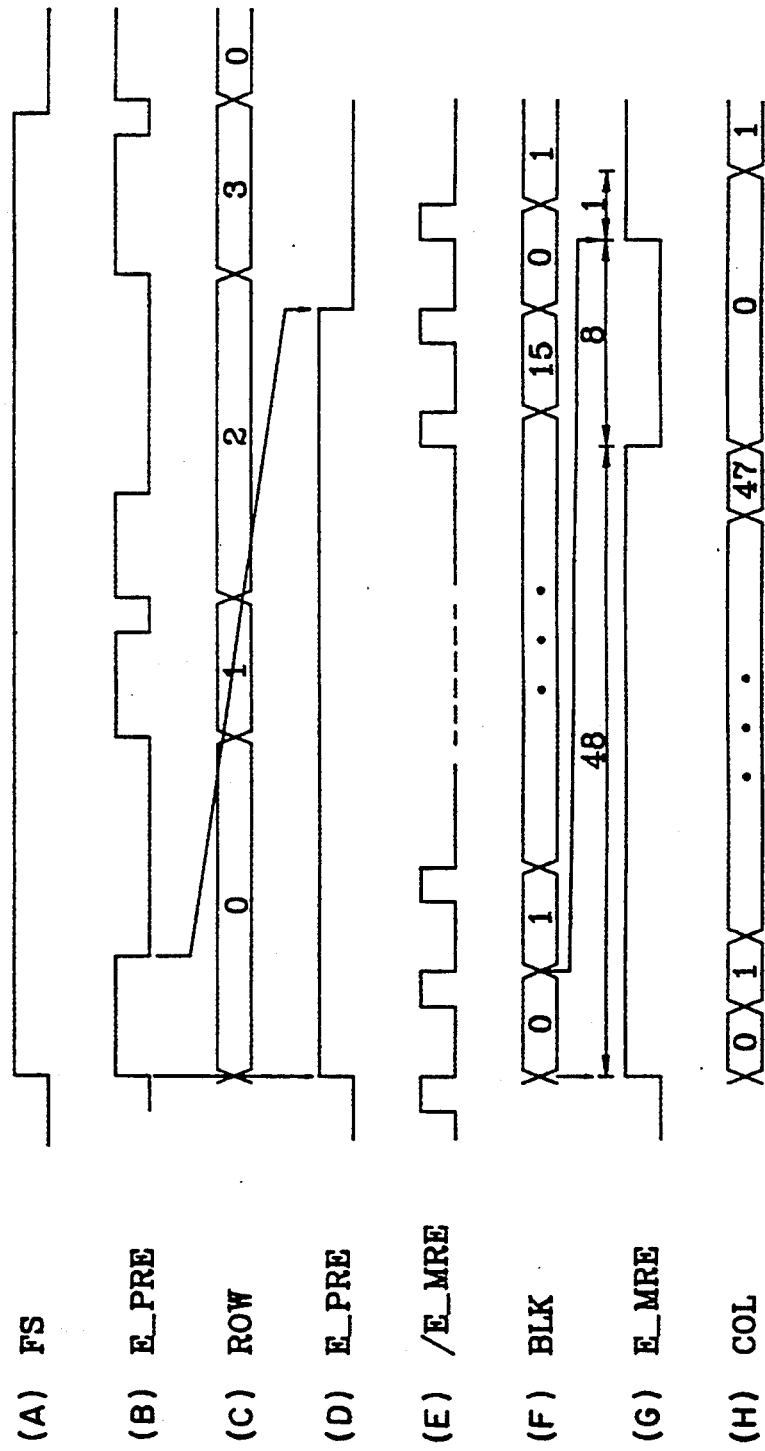
FIG. 25 is a timing chart of the control signals when the additional information are read out from the encoding memory during the encoding operation.

The image and additional information stored in the first memory portion are read out by the control signals as shown in FIGS. 24 and 25, and when the data corresponding to one frame are stored in a second frame memory portion (not shown) of the encoding memory 5, the read data are applied to a synchronizing and identifying signal generator 7. In the generator 7, the read data are divided into a plurality of inner codes and each of the inner codes is combined with synchronizing and identifying data to be applied to an inner encoder 8. By the inner encoder 8, the combined data to be applied from the generator 7 are encoded by the inner encoder 8 to be applied to a parallel to serial converter 9. The encoded data from the inner encoder 8 are input to the converter 9 in parallel by bytes and are output in series to be recorded in the recording medium 11 through a recording amplifier 10.

The process for decoding the image data reproduced from the recording medium 11 will be described hereinafter.

The image data, which are reproduced from the recording medium 11 and are amplified by a reproducing amplifier 12, are converted into parallel data by a serial to parallel converter 13. Also, the serial image data from the reproducing amplifier 13 are applied to a clock and synchronizing signal generator 14, so that a clock signal and a synchronizing signal necessary for decoding in the decoding unit are generated.

The image data converted into parallel by bytes by means of the converter 13 are applied to a time base corrector 15 which corrects, using the clock signal from the generator 15, a time base error occurring during recording and reproducing of data. Then, a synchronizing signal detector 16 receives the corrected image data from the corrector 15 and detects inner codes in the corrected image data so that the inner codes detected are decoded by an inner decoder 17. The image data corrected by the inner decoder 17 are simultaneously applied to a first demultiplexing circuit 18 and a second demultiplexing circuit 19 which are respectively comprised of one demultiplexer having one input terminal and two output terminals. If an error occurs in the range of correction capability of the apparatus during decoding of the reproduced data from the recording medium 11, after correction the corrected image data are generated from the inner encoder 17. However, if an error occurs beyond the range of the correction capability, the inner decoder 17 generates an error flag signal which indicates occurrence of error, and provides the error flag signal and the image data to the first and second demultiplexing circuits 18 and 19. During a reproducing operation at a normal speed, output data of the demultiplexing circuits 18 and 19 are respectively applied to a first multiplexing circuit 24 and a second multiplexing circuit 25 which are respectively comprised of one multiplexer having two input terminals and one output terminal. The multiplexing circuits 24 and 25 are provided for selecting either image data reproduced at normal speed of a head or image data reproduced at a high speed thereof.

I. REPRODUCING OPERATION OF NORMAL SPEED

Figure 35:
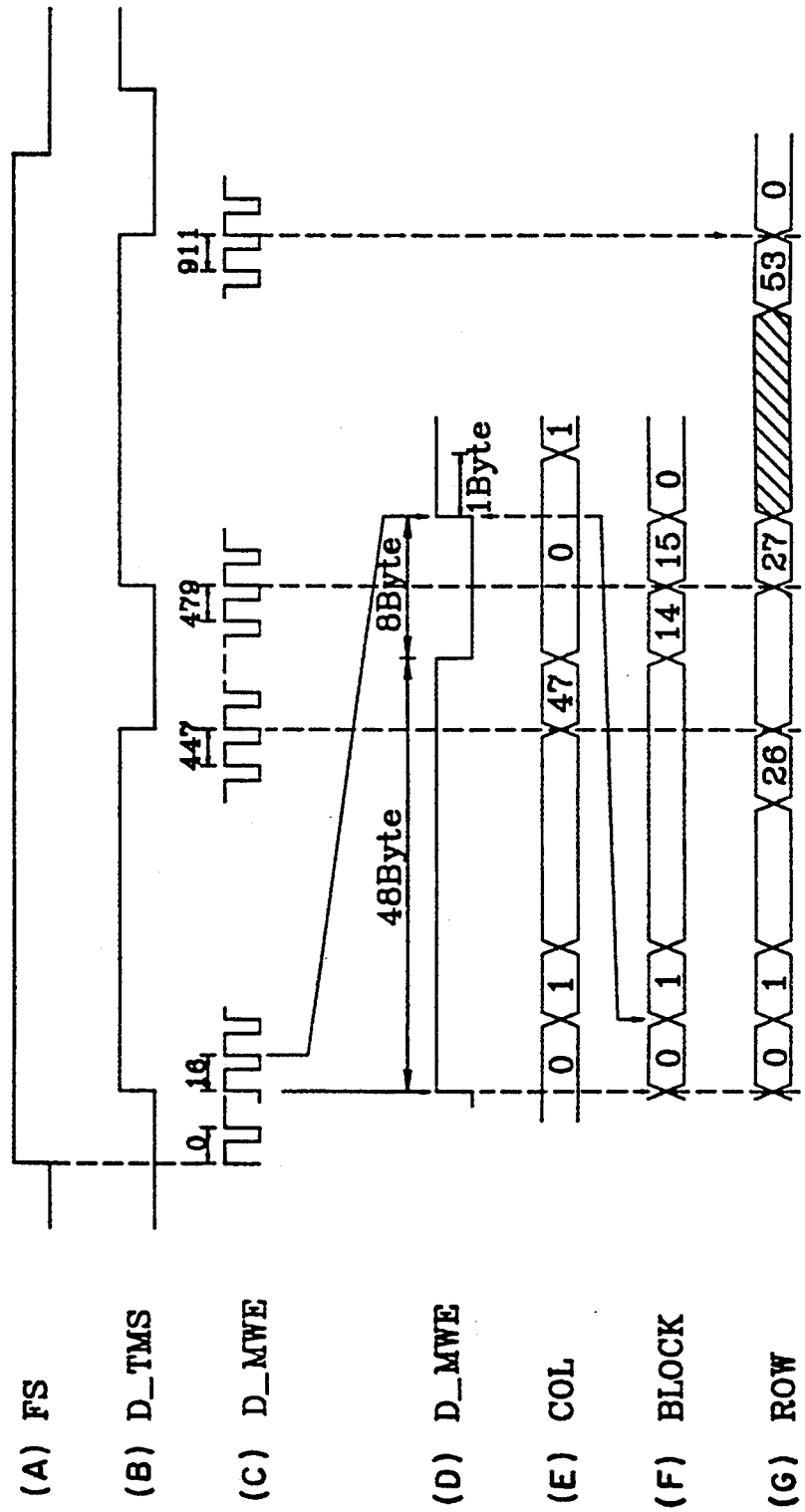
FIG. 35 is a timing chart of control signals when the image information are stored in the decoding memory during the decoding operation.

When the image data are reproduced at normal speed of a head, the output data and the error flag signal from the demultiplexing circuits 18 and 19 under control of a second memory controller 22 are respectively applied to an identifying data detector 20 and a decoding memory 21. In the identifying data detector 20, an identification signal is extracted from the image data supplied from the demultiplexing circuit 18 and then an address of the encoding memory 5 in which the data having the extracted identification signal are stored is detected so as to store the image data in a decoding memory in accordance with the detected address. Then, the decoding memory 21 is operated by control signals as shown in FIGS. 24 and 35.

If an error flag signal indicating that an error is generated in the image data added with an identifying signal is "1" the image data are not stored in the decoding memory 21 and the error flag signal only is stored in an error flag memory (not shown) of the decoding memory 21.

Similar to the encoding memory 5, the decoding memory 21 is capable of storing image data corresponding to two frames and has two frame memory portions, one of which stores image information corresponding to one frame, and the other of which stores additional information corresponding to one frame.

On the other hand, when data of one frame in the reproduced image data from the reproducing medium 11 are stored in a second frame memory portion, the previously stored data of one frame in a first frame memory are read to be applied to an outer decoder 23. The outer decoder 23 decodes the data from the decoding memory 21 using the error flag signal. Then, the outer decoder 23 corrects the error to generate corrected data when the reproduced data can be corrected. When the reproduced data can not be corrected, the data prior to being corrected in the outer decoder 23 and the error flag signal of a logic "1" are respectively applied to the multiplexing circuits 24 and 25 for selectively outputting data in accordance with reproducing speed modes of image data which are normal speed reproduction and a high speed reproduction. For example, the data selected by the multiplexing circuit 24 in accordance with respective speed modes are applied to a data reconstruction circuit 26 and the error flag signal is directly applied to an error correction circuit 27. Then, the data from the multiplexer 24 are reconstructed by the data reconstruction circuit 26 to the data prior to being compressed in the data compressor 3. To minimize image damage due to an error during recording or reproducing image data on/from the recording medium 11, an error correction code block process as described above has to be performed. But when such an error can not be corrected in the error correction code block process, the error can be corrected in the error correction circuit 27 which receives the data from the data reconstruction circuit 26 and the error flag signal from the multiplexing circuit 25, so that the reproduced image can be prevented from being degraded due to the error. The data corrected by the error correction circuit 27 are converted by a digital to analog converter 28 for final application to a monitor for display.

II. REPRODUCING OPERATION OF HIGH SPEED

When high speed reproduction is performed in the apparatus, the data selected by the demultiplexing circuits 18 and 19 are not applied to the decoding memory 21 and the data and the error flag signal are directly applied to the multiplexing circuits 24 and 25, respectively. The data and the error flag signal which are selected by the multiplexers 24 and 25 are respectively applied to the data reconstruction circuit 26 and the error correction circuit 27. The following operation except the above operation is similar to the reproduction operation at the normal speed.

The detailed operation of high speed reproduction according to the present invention will be described hereinafter.

Figure 26:
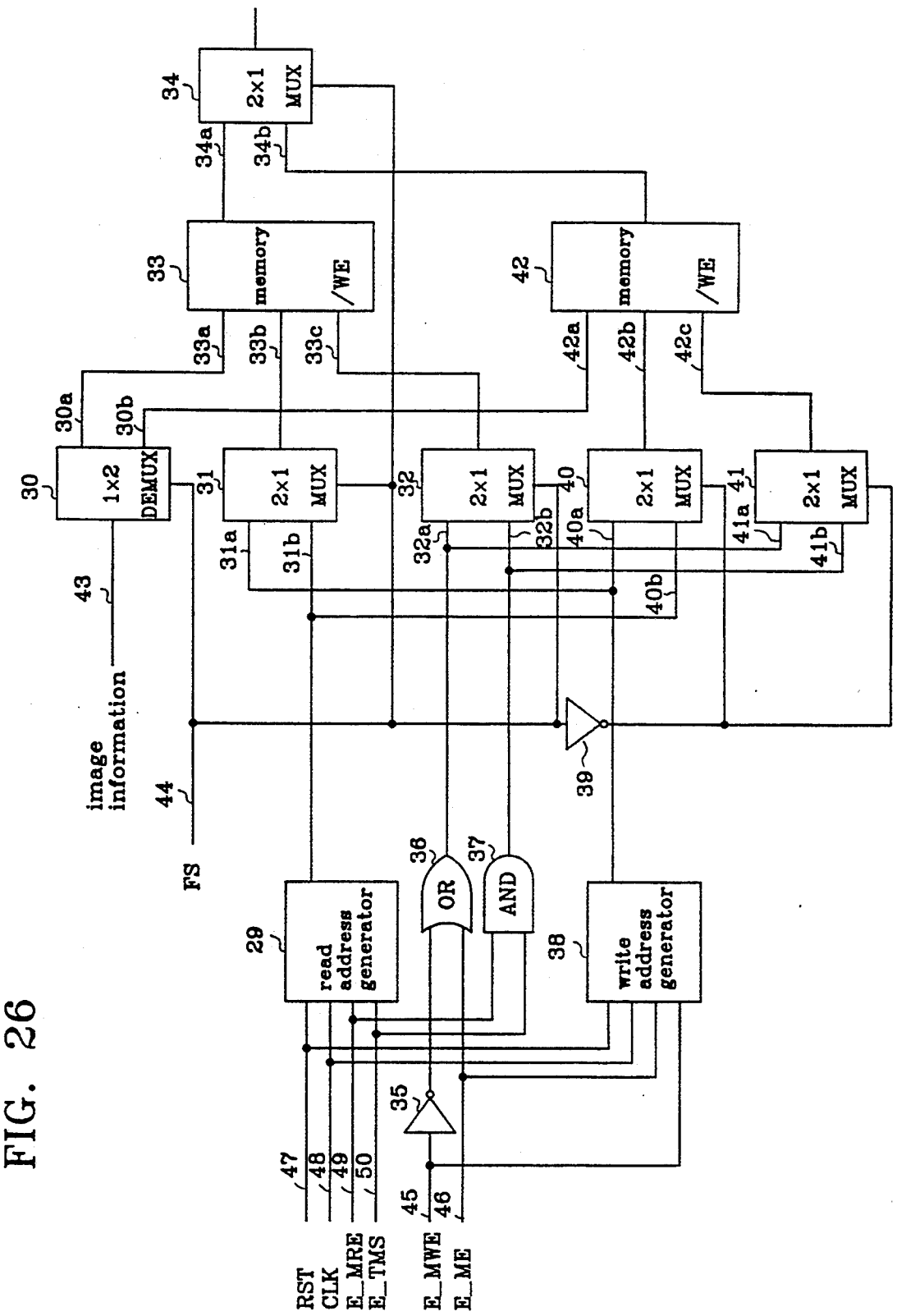
FIG. 26 is a detailed circuit diagram showing an example of the encoding memory and the encoding memory controller in the encoding unit as shown in FIG. 14, for storing and extracting image information therein.
Figure 27:
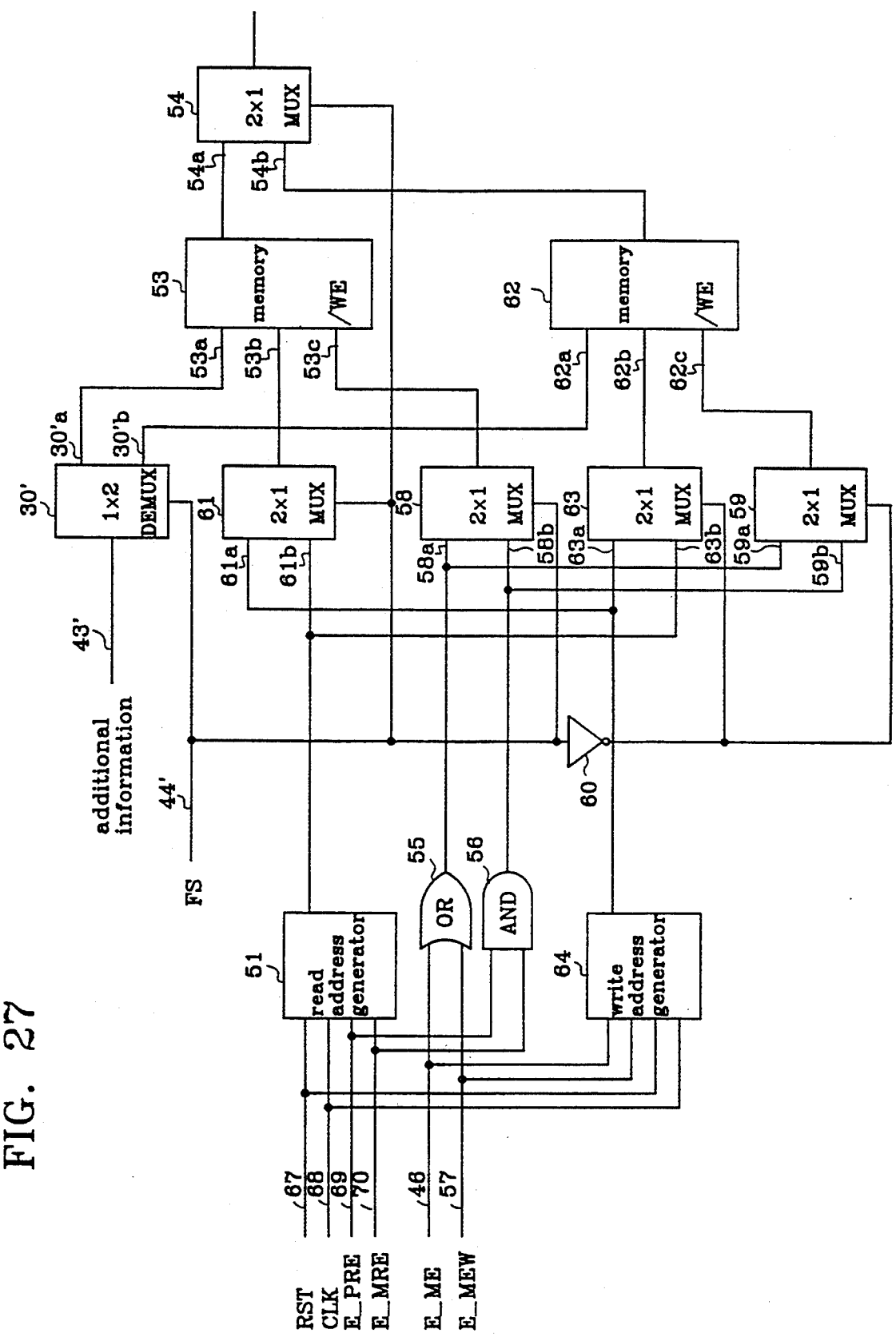
FIG. 27 is a detailed circuit diagram showing an example of the construction of the encoding memory and the encoding memory controller in the encoding unit as shown in FIG. 14, for storing and extracting the additional information therein.

FIG. 26 shows a detailed circuit which is comprised of the encoding memory 5 and the encoding memory controller 6 in the encoding unit as shown in FIG. 14 for storing and extracting only image information of the image data and FIG. 27 shows a detailed circuit diagram which is comprised of the encoding memory 5 and the encoding memory controller 6 in the encoding unit as shown in FIG. 14 for storing and extracting only additional information of the image data.

In FIG. 26, the image information applied though an input terminal 43 are selected by a demultiplexer 30 by a frame selection signal FS as shown in FIG. 15, and the selected image information are selectively stored in either a first encoding memory 33 or a second encoding memory 42 through respective output terminals 30a and 30b of the demultiplexer 30. For example, when the frame selection signal FS is "1", the image information applied through the input terminal 43 are stored in the first encoding memory 33 by the demultiplexer 30. However, when the signal FS is "0", the image information are stored in the second encoding memory 42.

Figure 22:
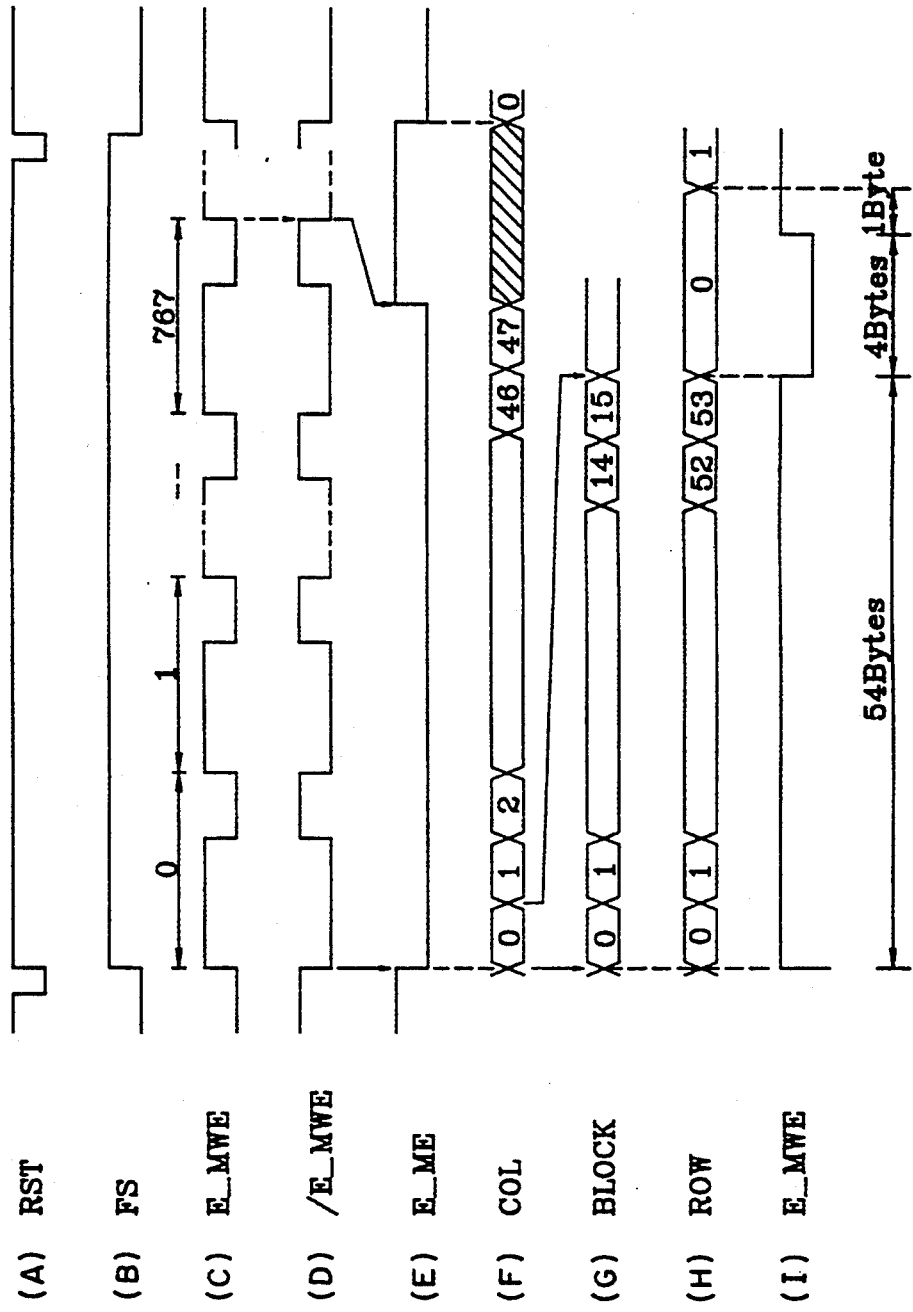
FIG. 22 is a timing chart of control signals when the image information are stored in the encoding memory during an encoding operation.

As mentioned above, in order to store the image information in the first encoding memory 33, a write address which is generated from a first write address generator 38 is selected by a first multiplexer 31 to be applied to an address terminal 33b of the first encoding memory 33, and an output signal of an OR gate 36 which receives an image information write enable signal /E_MWE and a memory enable signal E_ME shown in FIG. 22 are applied to a write enable terminal /WE, 33c of the first encoding memory 33.

As described above, the image information corresponding to one frame are stored in the first encoding memory 33 and the following image information corresponding to one frame are stored in the second encoding memory 42. In addition, when the following image information are stored in the second encoding memory 42, or the frame selection signal FS is "0" the image information stored previously in the first encoding memory 33 are simultaneously read out and the image information selected by the demultiplexer 30 then are applied to a data input terminal 42a of the second encoding memory 42. Also, an address signal from the first write address generator 38 is selected by a second multiplexer 40 and applied to an address terminal 42b of the second encoding memory 42, and the same signal as applied to the enable terminal 33c of the first encoding memory 33 is applied to an enable terminal 42c of the second encoding memory 42, so that the selected image information from the third multiplexer 40 can be stored in the second encoding memory 42.

On the other hand, when the frame selection signal FS is "0" the image information read out from the first encoding memory 33 are applied to one terminal 34a of two input terminals of a fifth multiplexer 34, and then an address signal generated from a first read address generator 29 is applied to the address terminal 33b of the first encoding memory 33 through the first multiplexer 31. An output signal of an AND gate 37, which receive an encoding memory read enable signal E_MRE and a track image information selection signal E_TMS through two input terminals thereof, is selected by a second multiplexer 32 and applied to the enable terminal 33c of the first encoding memory 33.

Accordingly, the image information storing memory of the encoding memory 5 as shown in FIG. 14 has the two encoding memories 33 and 42, each of which can store image information corresponding to one frame. When the frame selection signal FS is "138 , the image information of one frame being presently input are stored in the first encoding memory 33 and at the same time the previously stored image information in the second encoding memory 42 are read out. Also, when the frame selection signal FS is "0", the image information are stored in the second encoding memory 42 and at the same time the previously stored image information in the first encoding memory 33 are read out from the first encoding memory 33.

FIG. 27 is a detailed circuit diagram showing an example of the encoding memory 5 and the encoding memory controller 6 in the encoding unit as shown in FIG. 14 for storing and extracting only the additional information in the encoding memory 5. The additional information is the outer additional information P1 generated by the outer encoder 4 of FIG. 14 to be added with the inner additional information P2 generated by the inner encoder 8 of FIG. 14.

In FIG. 27, the additional information applied through an input terminal 43' are selected by a second demultiplexer 30', which is controlled by the frame selection signal FS as shown in FIG. 15, to be stored in a third encoding memory 53 or a fourth encoding memory 62. For example, when the frame selection signal FS is "1" the additional information are stored in the third encoding memory 53 through the second demultiplexer 30', and when the signal FS is "0" the additional information are stored in the fourth encoding memory 62 through the second demultiplexer 30'.

Figure 23:
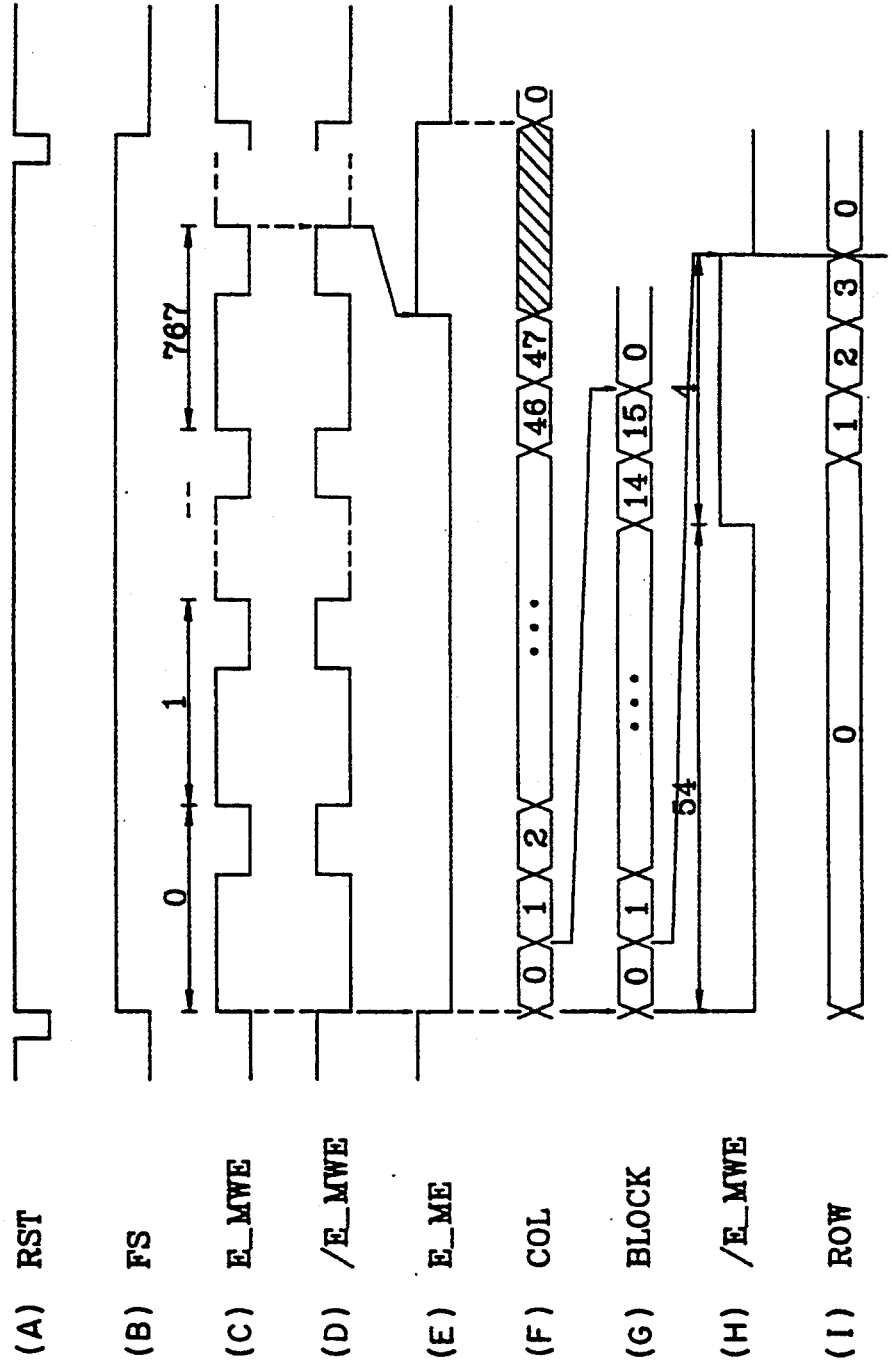
FIG. 23 is a timing chart of the control signals when the additional information are stored in the encoding memory during the encoding operation.

When the additional information are stored in the third encoding memory 62, a write address signal generated by a second write address generator 64 is selected by a sixth multiplexer 61 and applied to an address terminal 53b of the third encoding memory 53. To a write enable terminal /WE, 53c of the third encoding memory 53, an output signal of an OR gate 56, which receives the encoding memory write enable signal E_MWE and the memory enable signal E_ME as shown in FIG. 23, are applied.

As mentioned above, after storing the additional information corresponding to one frame in the third encoding memory 53, the following additional information are stored in the fourth encoding memory 62 with the same storing method as described above. Similar to storing and extracting method of the image information, the additional information are stored in the fourth encoding memory 62 and at the same time the previously stored additional information in the third encoding memory 53 are read out from the third encoding memory 53.

In detail, the additional information selected by the demultiplexer 30' then are applied to a data input terminal 62a of the fourth encoding memory 62. An address signal from the second write address generator 64 is selected by an eighth multiplexer 63 and applied to an address terminal 62b of the fourth encoding memory 62, and the same signal as inputted to the enable terminal 53c of the third encoding memory 53 is applied to an enable terminal 62c of the fourth encoding memory 62, so that the selected additional information from the second demultiplexer 30' can be stored in the second encoding memory 62.

On the other hand, when the frame selection signal FS is "0" the additional information read out from the third encoding memory 53 are applied to one terminal 54a of two input terminals of a tenth multiplexer 54, and then an address signal generated from a second read address generator 51 is applied to the address terminal 53b of the third encoding memory 53 through the sixth multiplexer 61. An output signal of an AND gate 56, which receives the encoding memory read enable signal E_MRE and the additional information selection signal E_TMS through two input terminals thereof, is selected by a seventh multiplexer 58 and applied to the enable terminal 53c of the third encoding memory 53.

Accordingly, the additional information storing memory of the encoding memory 5 as shown in FIG. 14 is comprises the two encoding memories 53 and 62, each of which can store additional information corresponding to one frame. When the frame selection signal FS is "1" the additional information of one frame being presently inputted are stored in the third encoding memory 53 and at the same time the previously stored additional information in the fourth encoding memory 62 are read out Also, when the frame selection signal FS is "0" the additional information are stored in the fourth encoding memory 62 and at the same time the previously stored image information in the third encoding memory 53 are read out from the third encoding memory 53.

Hereinafter, operation and construction of the first write and read address generators 38 and 29 will be described in detail.

Figure 39:
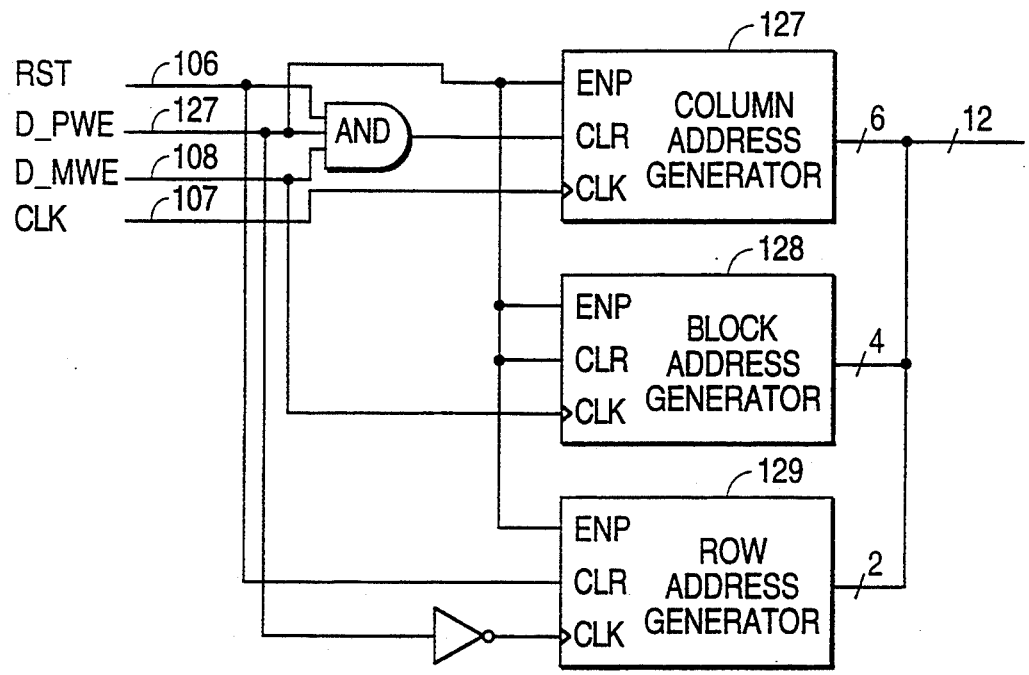
FIG. 39 is a detailed circuit diagram of the write address generator 118 as shown in FIG. 29.

FIG. 39 is a detailed circuit diagram of the first write address generator 38 as shown in FIG. 26, and FIG. 22 is a timing chart showing operation of the first write address generator 38.

Figure 34:
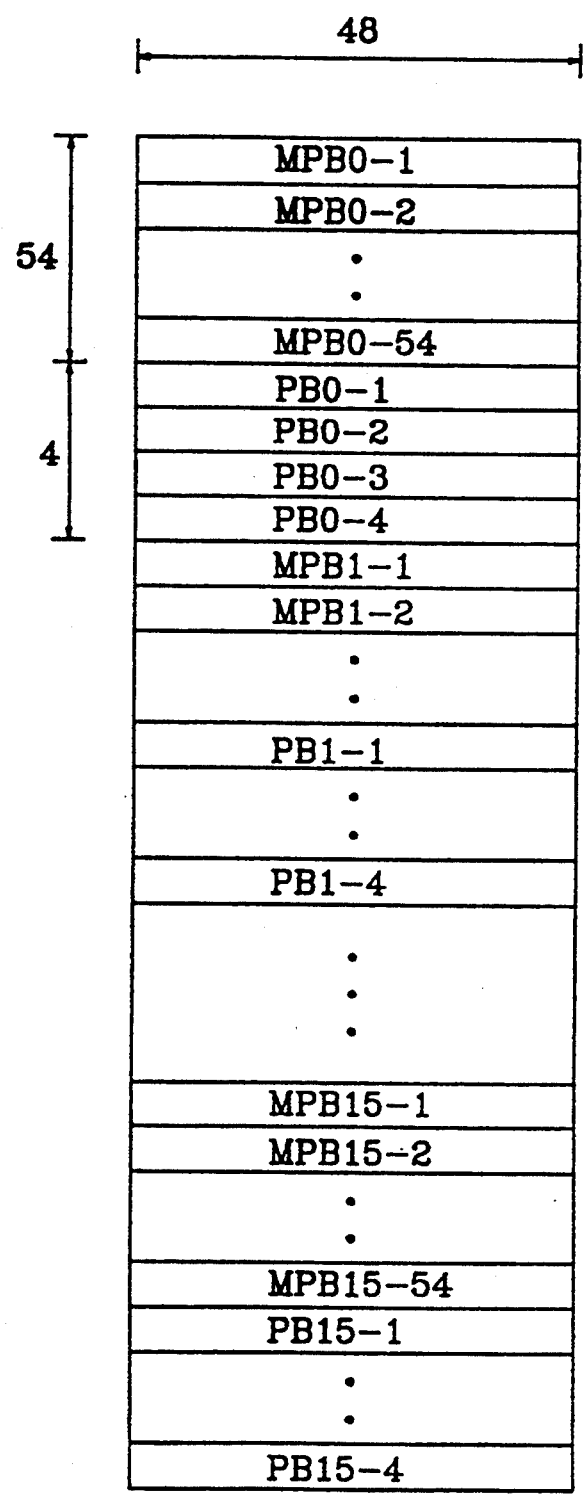
FIG. 34 is a diagram showing the structure of data from the outer encoder 4 as shown in FIG. 14.

The output data from the outer encoder 4 have the data structure as shown in FIG. 34. In FIG. 34, the data structure has forty eight symbols in a row direction to be used in the inner encoder 4 and fifty four image data to which is added four additional information in a column direction.

Figure 30:
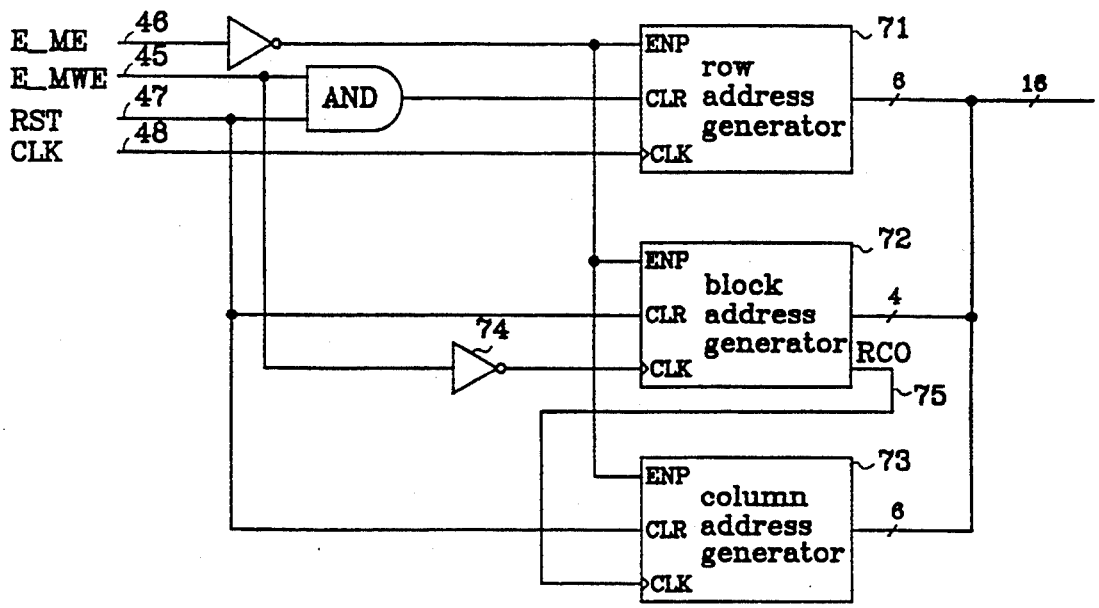
FIG. 30 is a detailed circuit diagram generator 38 as shown in FIG. 26.

Only the fifty four image data from the outer encoder 4 are stored in the memory 33 or the memory 42 in accordance with address signals to be generated by the circuit of FIG. 30 in response to control signals as shown in FIG. 22. The image information of one frame 5 are comprised of 768 unit blocks. In detail, when the fifty four image data arranged serially per one block are referred to as "one unit block", the image information has 16×48 unit blocks in which sixteen unit blocks in the column direction and forty eight unit blocks in the row direction are arranged in matrix.

In the encoding memory 5 having such a memory structure, generation of addresses is controlled in accordance with respective row address, block address, and column address. When information are stored in the encoding memory, a column address is increased by "1" between "0" and "53" in the column direction, while the signal E_MWE is "1". If the column address is counted to "53" by increasing of the column address, the signal E_MWE is "1" during period of four symbols. Subsequently, the block address is increased by "1" between "0" and "15". If the block address is counted to "15" by increasing of the block address, then the row address is increased by "1" between "0" and "47". This address generating operation is repeated, and data are stored in the encoding memory when the signal E_ME is "0"

FIG. 30 is a detailed circuit diagram of the first write address generator 38. In FIG. 30, reference numeral 71 is a row address generator in which a row address therefrom is increased from "0" to "53" during writing of fifty four clock cycles corresponding to the image information of one code block to be applied from the outer encoder 4, and is "0" during period of four clock cycles corresponding to the additional information. The clock signal CLK to be used therein are applied from a clock input terminal 48 to be applied to the row address generator 71. The row address generator 71 is reset by a reset signal RST for every frame. In a block address generator 72 of FIG. 30, a block address is increased by "1" between "0" and "15" and the write address signal /E_MWE applied through an inverting gate 74 is used as a clock signal of the generator 72. The block address generator 72 is reset by a reset signal RST.

In addition, a column address generator 73 uses a ripple carrier signal RCO from the block address generator 72 as a clock signal thereof so that a column address is increased by "1" when the ripple carrier signal RCO from the block address generator 72 is generated and is counted between "0" and "47".

Using the address signals and the write enable signal /E_MWE, data having the structure as shown FIG. 16 are stored in the first encoding memory 33 of FIG. 26. In FIG. 16, data MPB0-1 to MPB0-54 are an inner code unit to be provided to the synchronizing and identifying signal generator 7 as shown in FIG. 14.

Figure 31:
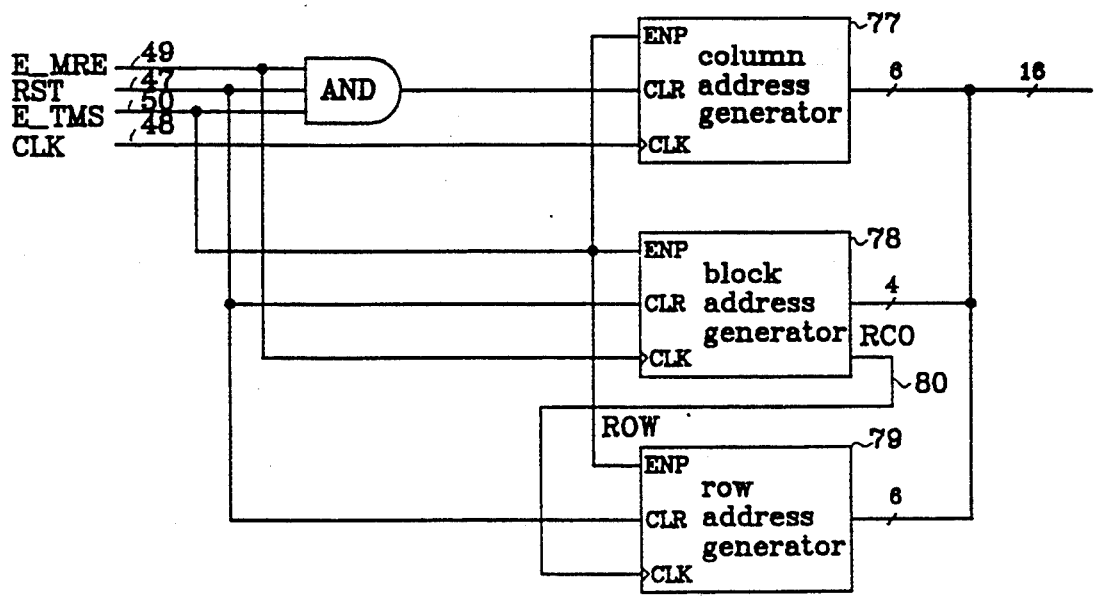
FIG. 31 is a detailed circuit diagram generator 29 as shown in FIG. 26.

Hereinafter, operation of the first read address generator 29 will be described with reference to FIGS. 31 and 24 showing a detailed circuit and a timing chart thereof respectively.

The stored data in the memory 5 for storing image information has a data structure as shown in FIG. 16 of for example sixteen image information data blocks per one frame. One image information data block is comprised of forty eight symbols to be used for the inner encoding in the row direction and fifty four image data. The data stored in the memory as the data structure of FIG. 16 are divided and recorded on two tracks in the recording medium 11. On one of the two tracks, the image data having a data structure as shown in FIG. 17 are recorded, and on the other of the two tracks the image data having a data structure as shown in FIG. 18 are recorded. As previously set with reference to FIG. 13, the image information and the additional information thereof are recorded in the two middle portions TM1 and TM2 in two tracks. Operation of recording the information on the two tracks is performed by the signal E_TMS as shown in FIG. 24.

As described above, the data stored in the encoding memory 5 are comprised of eight hundred sixty four unit blocks. In detail, when fifty eight symbols arranged in the row direction of the data structure are referred to as "one unit block", the image information have 16×54 unit blocks in which sixteen unit blocks of the column direction and fifty four unit blocks of the row direction are arranged in matrix.

In the encoding memory 5 having such a memory structure, generation of an address is controlled in accordance with respective a row address, a block address, and a column address. When data are read out from the encoding memory, a column address is increased by "1" between "0" and "47" in the column direction. When the column address is counted to "47" by increasing of the column address, a block address then is increased by "1" between "0" and "15". If the block address is counted to "15" by increasing of the block address, then the row address is increased by "1" between "0" and "53". This address generating operation is repeated period for one frame for every period.

FIG. 31 is a detailed circuit diagram of the first read address generator 29. In FIG. 31, reference numeral 77 is a column address generator which is reset by an output signal of an AND gate to receive a reset signal RST, a control signal E_MRE for distinguishing the image information and the additional information, and a control signal E_TMS to inform recording positions of the image and additional information on the track of the recording medium 11 of every frame. In a block address generator 78 of FIG. 31, a block address is increased by "1" every forty eight clock cycles between 0 and 15 and the read address signal E_MRE is used as a clock signal of the block address generator 78. The block address generator 78 is reset by the reset signal RST every frame.

In addition, a row address generator 79 uses a ripple carrier signal RCO from the block address generator 78 as a clock signal thereof, so that a column address is increased by "1" when the ripple carrier signal RCO from the block address generator 78 is generated, and is counted between "0" and "53".

Using the read address signals and the read enable signal E_MRE, the data having the data structure as shown FIGS. 17 and 18 are read out from the first encoding memory 33 of FIG. 26.

Figure 32:
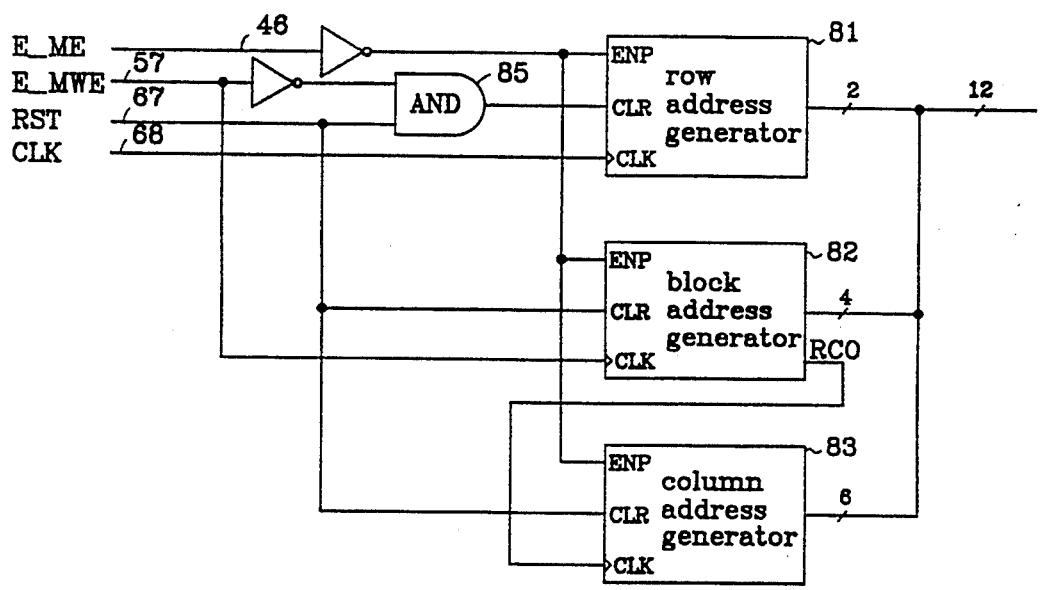
FIG. 32 is a detailed circuit diagram generator 64 as shown in FIG. 27.

Hereinafter, operation of the second write address generator 64 and the second read address generator 51 will be described with reference to FIG. 32 showing a detailed circuit of the generator 64 and a timing chart thereof respectively.

The data from the outer encoder 4 have a data structure as shown in FIG. 34, and only the additional information of the data in the column direction are selectively stored in the third and fourth encoding memories 53 and 62 by the control signals of FIG. 23 and an address signal as generated in the circuit of FIG. 32.

In addition, the image information of one frame are comprised of seven hundred sixty eight unit blocks with each of the unit blocks having fifty four symbols. In detail, when the fifty four symbols of one block are referred to as "one unit block", the image information have 16×48 unit blocks in which sixteen unit blocks in the column direction and forty eight unit blocks in the row direction are arranged in matrix. Further, because each of the unit blocks has the added four additional information, the additional information of one frame are comprised of 4×16×48 symbols.

In the encoding memory 5 having such a memory structure, generation of an address is controlled in accordance with respective row address, block address, and column address. When data are stored in the encoding memory, a row address is increased by "1" between "0" and "3" in the row direction, while the memory enable signal E_ME is "0" and the memory write enable signal E_MWE is "0". If the row address is to set to "3" by increasing of the row address, a block address is increased by "1" between "0" and "15". Also, if the block address is counted to "15" by increasing of the block address, then a column address is increased by "1" between "0" and "47". Those address generating operations are repeated every frame.

FIG. 32 is a detailed circuit diagram of the second write address generator 64 as shown in FIG. 27. In FIG. 32, reference numeral 81 is a row address generator in which a row address therefrom is increased from "0" to "3" during a period of fifty four clock cycles corresponding to the image information of outer code block, and is "0" during period of four clock cycles corresponding to the additional information. The clock CLK to be used therein are applied from a clock input terminal 68 to be applied to a clock terminal of the row address generator 81. The row address generator 81 is reset by a reset signal RST generated every frame and the memory write enable signal /E_MWE which is "0" during a period of the image information of fifty four symbols and "1" during period of the additional information of four symbols.

In a block address generator 82 of FIG. 32, a block address is increased by "1" between "0" and "15" every time fifty eight clock cycles and the memory write address signal /E_MWE is used as a clock signal of the generator 82. The block address generator 82 is reset by a reset signal RST generated every frame.

In addition, a column address generator 83 uses a ripple carrier signal RCO from the block address generator 82 as a clock signal thereof, so that a column address is increased by "1" every time the ripple carrier signal RCO from the block address generator 82 is generated, and is counted between "0" and "47".

Using the generation of the address signals and the memory write enable signal E_MWE, data having the structure as shown FIG. 19 are stored in the third encoding memory 53 of FIG. 26. In FIG. 19, reference symbols PB0_1 to PB15_4 are an inner code unit to be provided to the inner encoder 8 as shown in FIG. 14.

Figure 33:
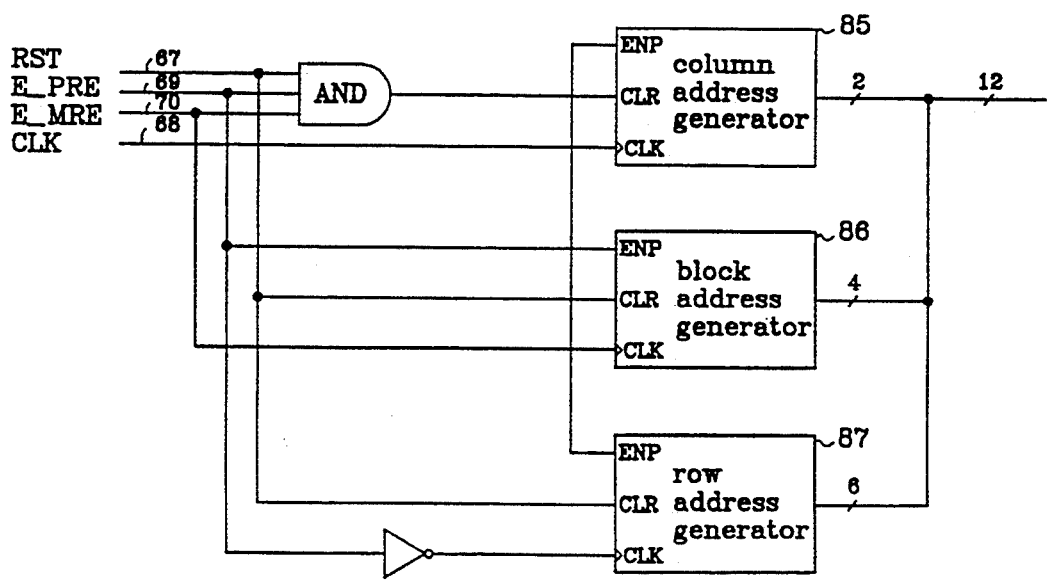
FIG. 33 is a detailed circuit diagram generator 51 as shown in FIG. 27.

Hereinafter, operation of the second read address generator 51 will be described with reference to FIGS. 33 and 25 showing a detailed circuit and a timing chart thereof respectively.

The stored data in the encoding memory 5 for storing additional information has a data structure as shown in FIG. 19. One image information data block is comprised of forty eight symbols to be used for the inner encoding in the row direction and the four additional informations. The data stored in the memory having the data structure of FIG. 19 are divided and recorded on upper and bottom portions TU1, TB1, TU2 and TB2 of two tracks in the recording medium 11. The data having a data structure as shown in FIGS. 20A and 20B are recorded on the upper and bottom portions TU1 and TB1 in one the two tracks, and the data having a data structure as shown in FIGS. 21A and 21B are recorded the upper and bottom portions of the other of the two tracks. As shown in FIG. 13, only the additional informations are recorded on the upper portions TU1 and TU2 and the bottom portions TB1 and TB2 of each track, and are divided into two tracks.

In addition, in the encoding memory 5 having such a memory structure, generation of an address is controlled in accordance with respective row address, block address, and column address. When data are read out from the encoding memory, a column address is increased by "1" between "0" and "47" in the column direction. When the column address is counted to "47" by increasing of the column address, a block address then is increased by "1" between "0" and "15". If the block address is counted to "15" by increasing of the block address, then the row address is increased by "1" between "0" and "3". The address generation operation is repeated period for one frame for every period.

FIG. 33 is a detailed circuit diagram of the second read address generator 51. In FIG. 33, reference numeral 85 is a column address generator which is reset by an output signal of an AND gate to receive a reset signal RST generated every frame, a control signal E_MRE for distinguishing periods of the outer additional information generated by the outer encoding and the inner additional information generated by the inner encoding, and a control signal E_PRE to control recording positions of the image and additional information on the track of the recording medium 11, every frame. Also, in the column address generator 85, the column address is increased by "1" between "0" and "47" during a period of forty eight clock cycles corresponding to one inner code block and is maintained at "0" during a period of eight clock cycles corresponding to the inner additional information. In a block address generator 86 of FIG. 33, a block address is increased by "1" every fifty six clock cycles between 0 and 15 and the memory read enable signal E_MRE is used as a clock signal of the block address generator 86. The block address generator 86 is reset by the reset signal RST every frame.

In addition, in a row address generator 87, a row address is increased by "1" between "0" and "3" every time the block address is counted to 15. The block address generator 87 uses an inverted control signal /E_PRE in which the signal E_PRE is inverted by an invertor gate, as a clock signal thereof.

Using the generated read address signals and the read enable signal E_MRE, the data having the data structure as shown FIGS. 20 and 21 are read out from the third or fourth encoding memory 53 or 62 of FIG. 27.

Figure 28:
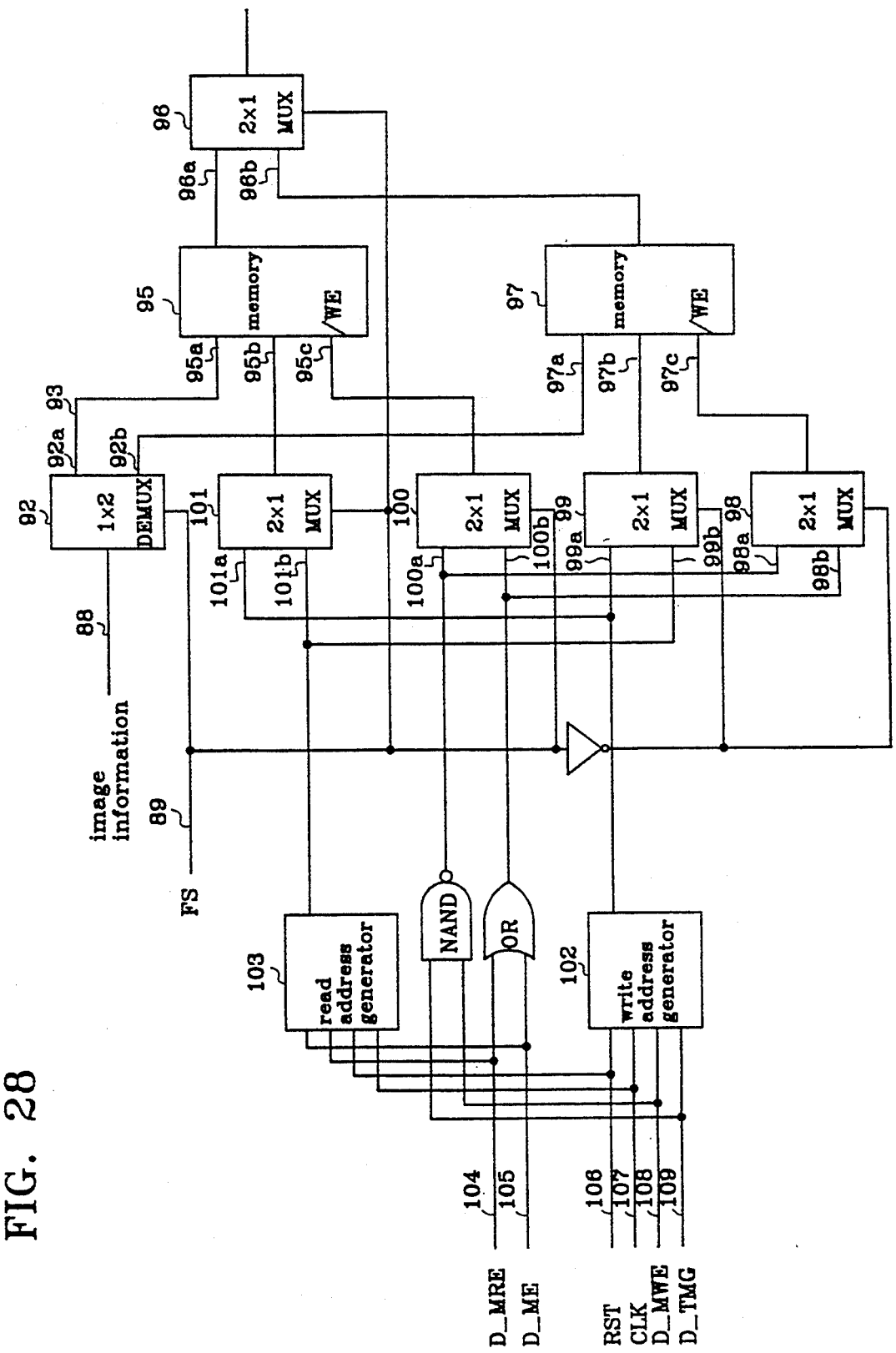
FIG. 28 is a detailed circuit diagram showing an example of the construction of the decoding memory and the decoding memory controller in the decoding unit as shown in FIG. 14, so as to store and extract image information therein.
Figure 37:
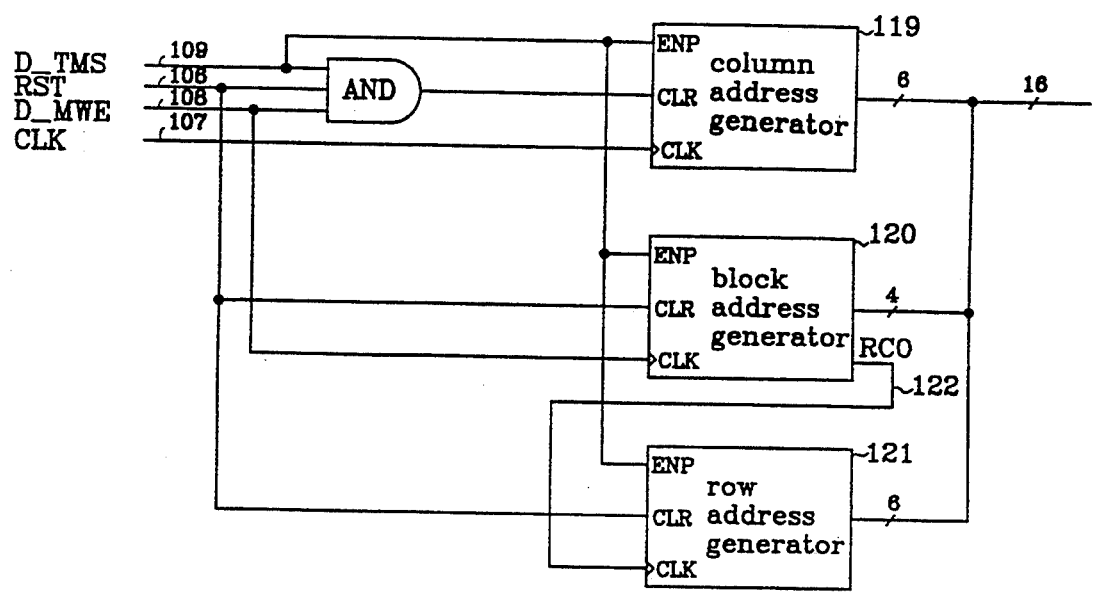
FIG. 37 is a detailed circuit diagram of the read address generator 103 as shown in FIG. 28.

FIG. 28 is a detailed circuit diagram showing an example of the decoding memory 21 and the decoding memory controller 22 in the decoding unit as shown in FIG. 14 for storing and extracting only image information therein. FIG. 35 is a timing chart showing storing of image information data in the decoding memory 21, and FIG. 37 is a detailed circuit diagram of a third write address generator 102 as shown in FIG. 28.

Referring to FIG. 28, operation of a third write address generator 102 will be described hereinafter.

When the image data are stored in the decoding memory 21 and data corresponding to inner code length in the row direction of data matrix are previously stored, an address of the column direction is increased by "1". For example, an address of the row direction is generated by a column address generator 119 in which the column address is increased by "1" between "0" and "47". If the column address is counted to "47", then in a block address generator 120 a block address is increased by "1" between "0" and "15". Also, if the block address is counted to "15", in a row address generator 121 a row address is increased by "1" between "0" and "53". The address generating operation is repeated every frame.

The structure of the data stored thus is the same as the data structure as shown in FIG. 16. Subsequently, when the data of the following frame are stored in the decoding memory 97, at the same time the previously stored data in the decoding memory 95 are read out from the decoding memory 95.

Figure 36:
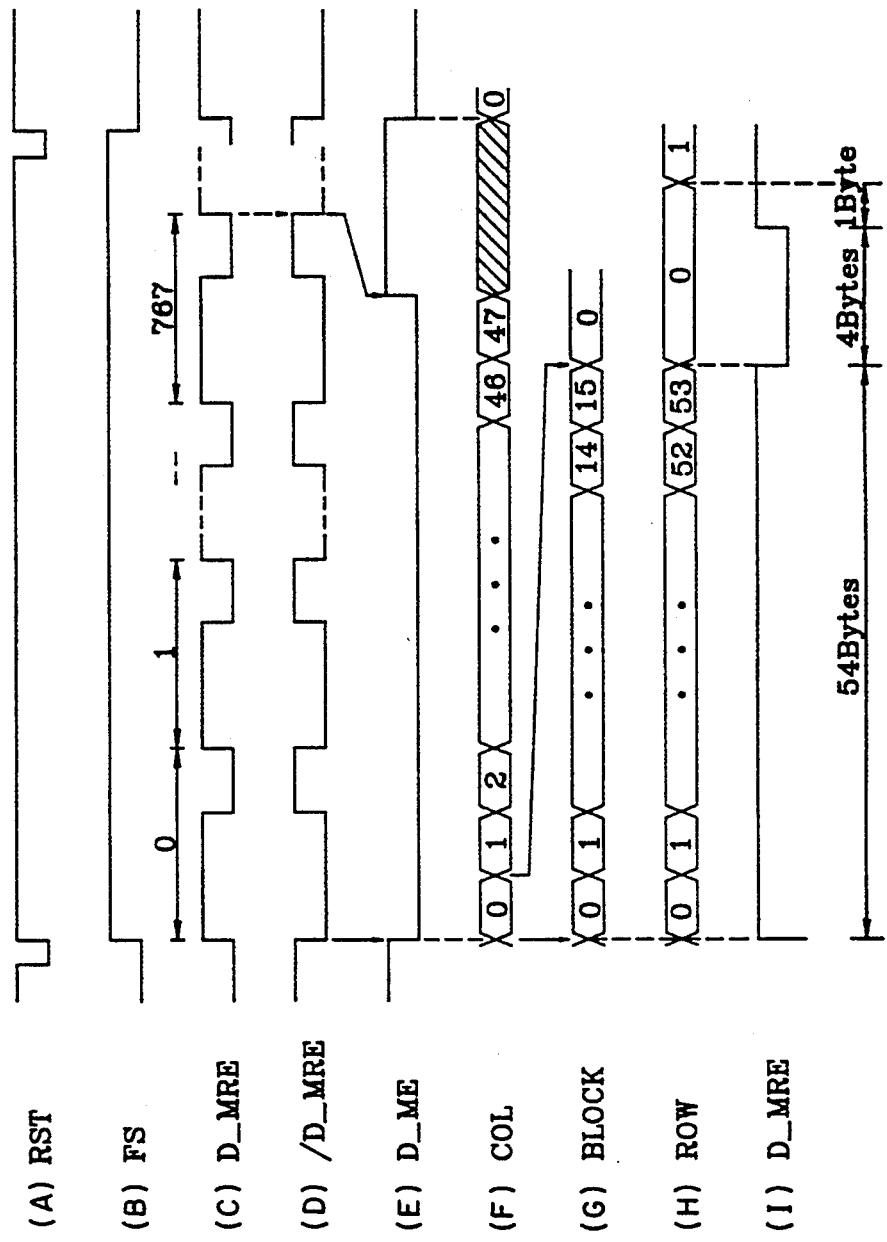
FIG. 36 is a timing chart of the control signals when the additional information are read out from the decoding memory during the decoding operation.
Figure 38:
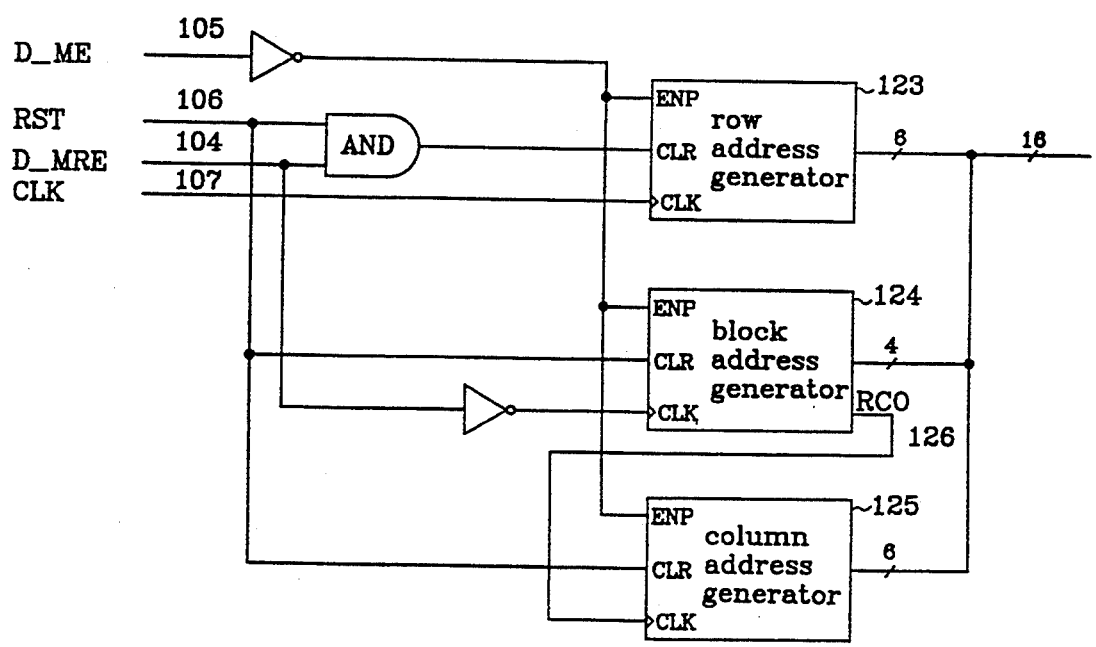
FIG. 38 is a detailed circuit diagram of the write address generator 102 as shown in FIG. 28.

FIG. 36 is a timing chart showing that the image information data are read out from the decoding memory 21 and FIG. 38 is a detailed circuit diagram of a third read address generator 103 as shown in FIG. 28.

Referring to FIG. 28, operation of the third read address generator 103 will be described hereinafter.

When the image data are read from the decoding memory 21, a row address generator 123 is first operated. In the row address generator 123, a row address is increased by "1" between "0" and "53". If the row address is counted to "53", then in a block address generator 124 a block address is increased by "1" between "0" and "15". If the block address is counted to "15", then in a column address generator 125 a column address is increased by "1" between "0" and "47". The operation of generating the address signals is repeated every frame.

Figure 29:
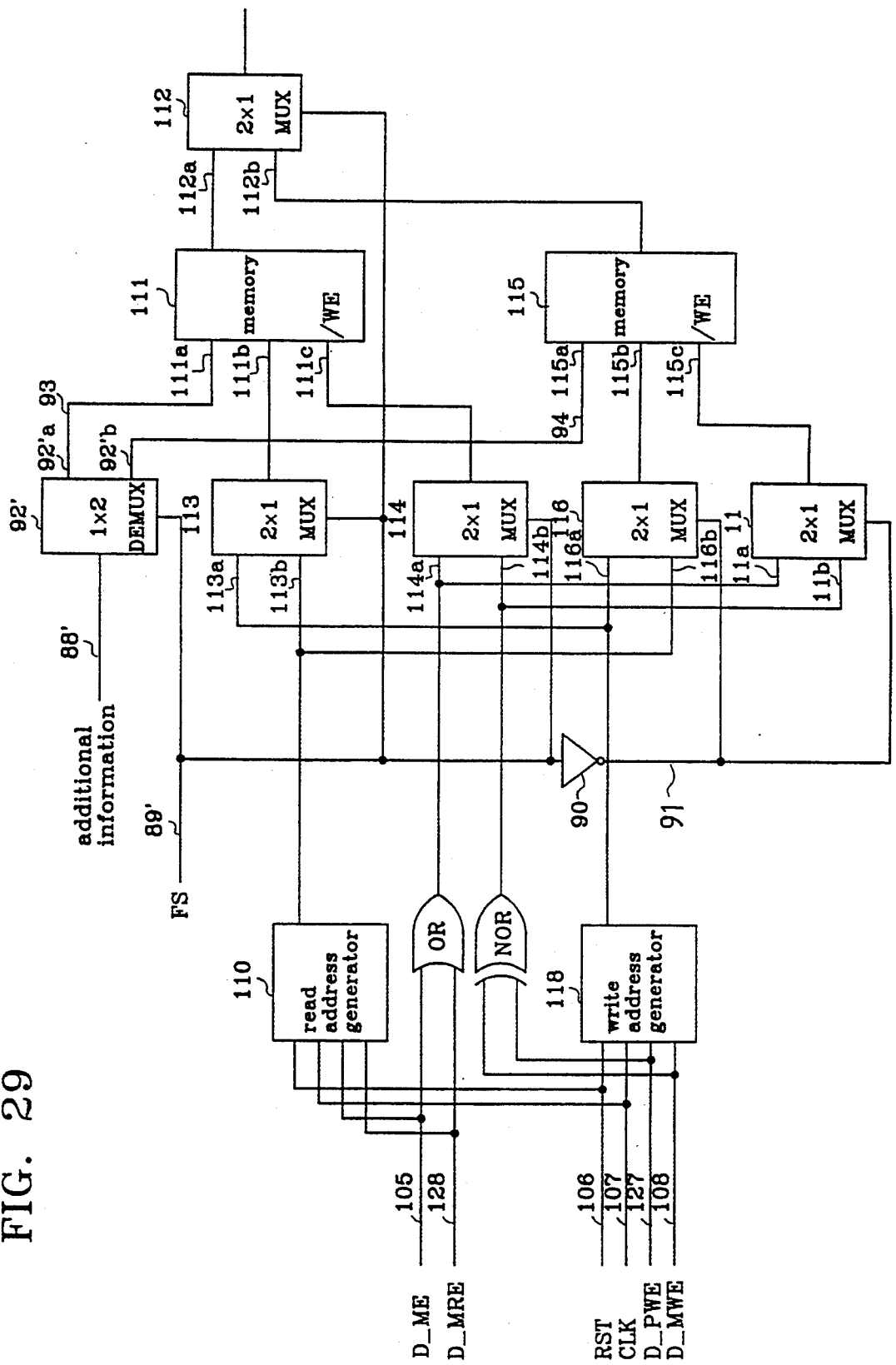
FIG. 29 is a detailed circuit diagram showing an example of the construction of the decoding memory and the decoding memory controller in the decoding unit as shown in FIG. 14, for storing and extracting the additional information therein; of the write address

Referring to FIG. 29, operation of a write address generator 118 for generating an additional information write address will be described hereinafter.

Figure 41:
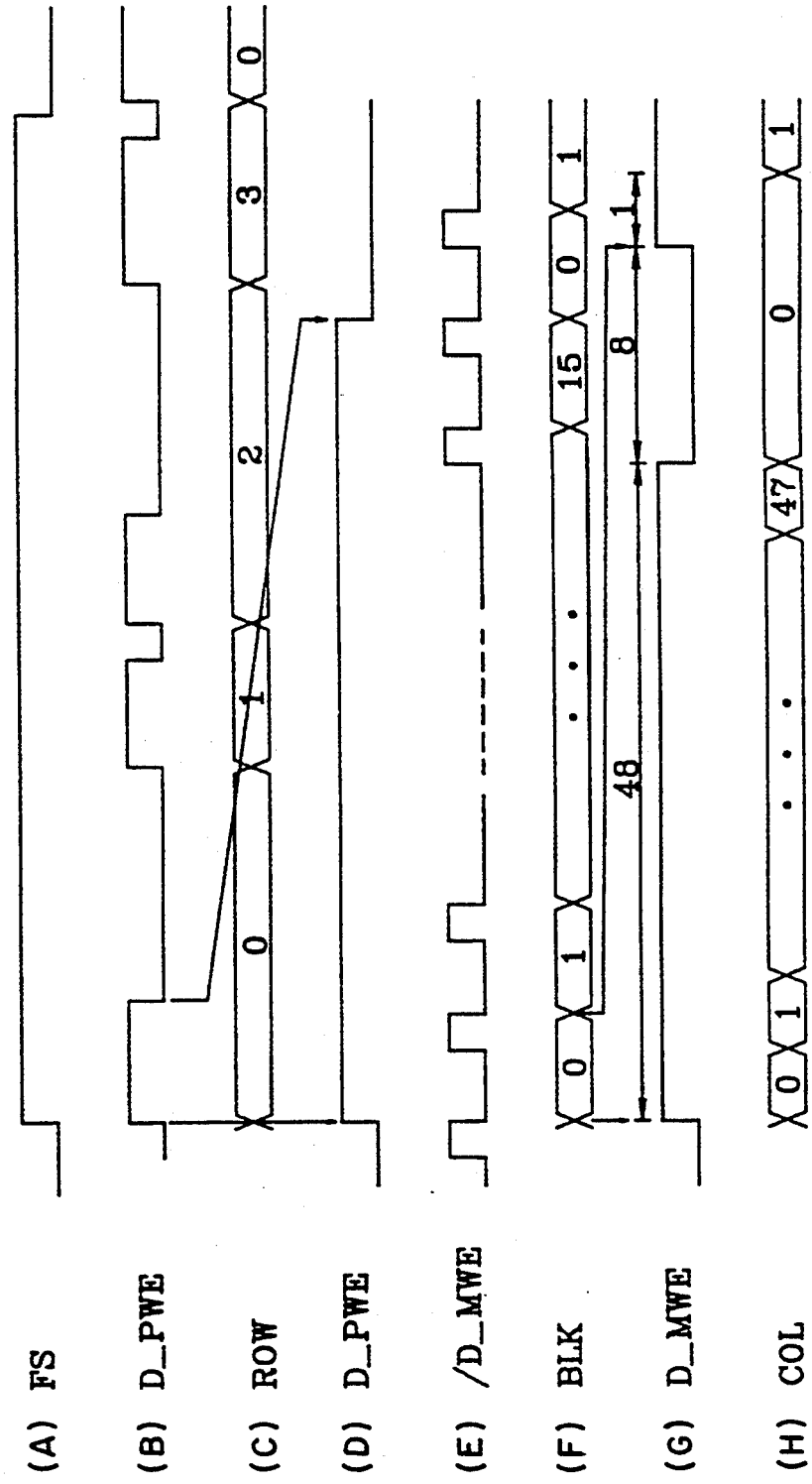
FIG. 41 is a timing chart control signals when the image information are stored in the decoding memory during a decoding operation.

FIG. 39 is a detailed circuit diagram of the write address generator 118 as shown in FIG. 29 and FIG. 41 is a timing chart showing that the additional information data are stored in the decoding memory 21.

In FIG. 39 when the additional information are stored in the decoding memory 21 and the information corresponding to inner code length in the row direction of a data matrix are previously stored an address of the column direction is increased by "1". For example, an address of the row direction is generated by a column address generator 127 in which the column address is increased by "1" between "0" and "47". If the column address is counted to "47", then in a block address generator 128 a block address is increased by "1" between "0" and "15". If the block address is counted to "15" in a row address generator 129 a row address is increased by "1" between "0" and "3". The address generating operation is repeated every frame.

The structure of the data stored thus is same as the data structure as shown in FIG. 19. Subsequently, the additional information of the following frame are stored in the decoding memory at the same time the previously stored additional in the decoding memory are read out from the decoding memory.

Figure 40:
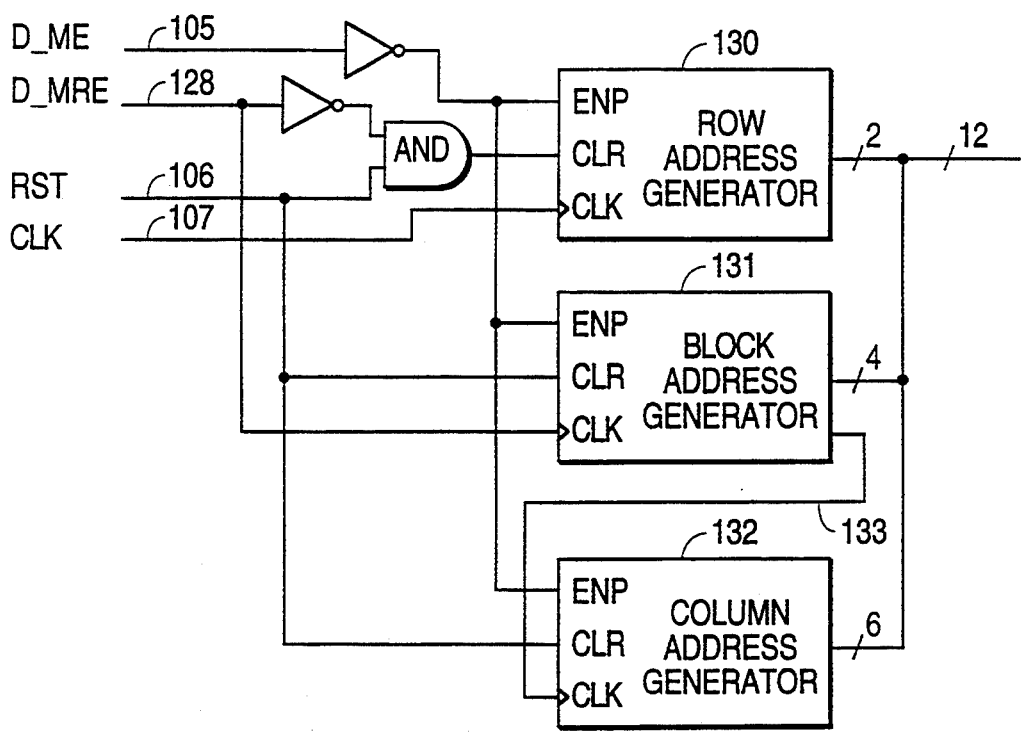
FIG. 40 is a detailed circuit diagram of the read address generator 110 as shown in FIG. 29.
Figure 42:
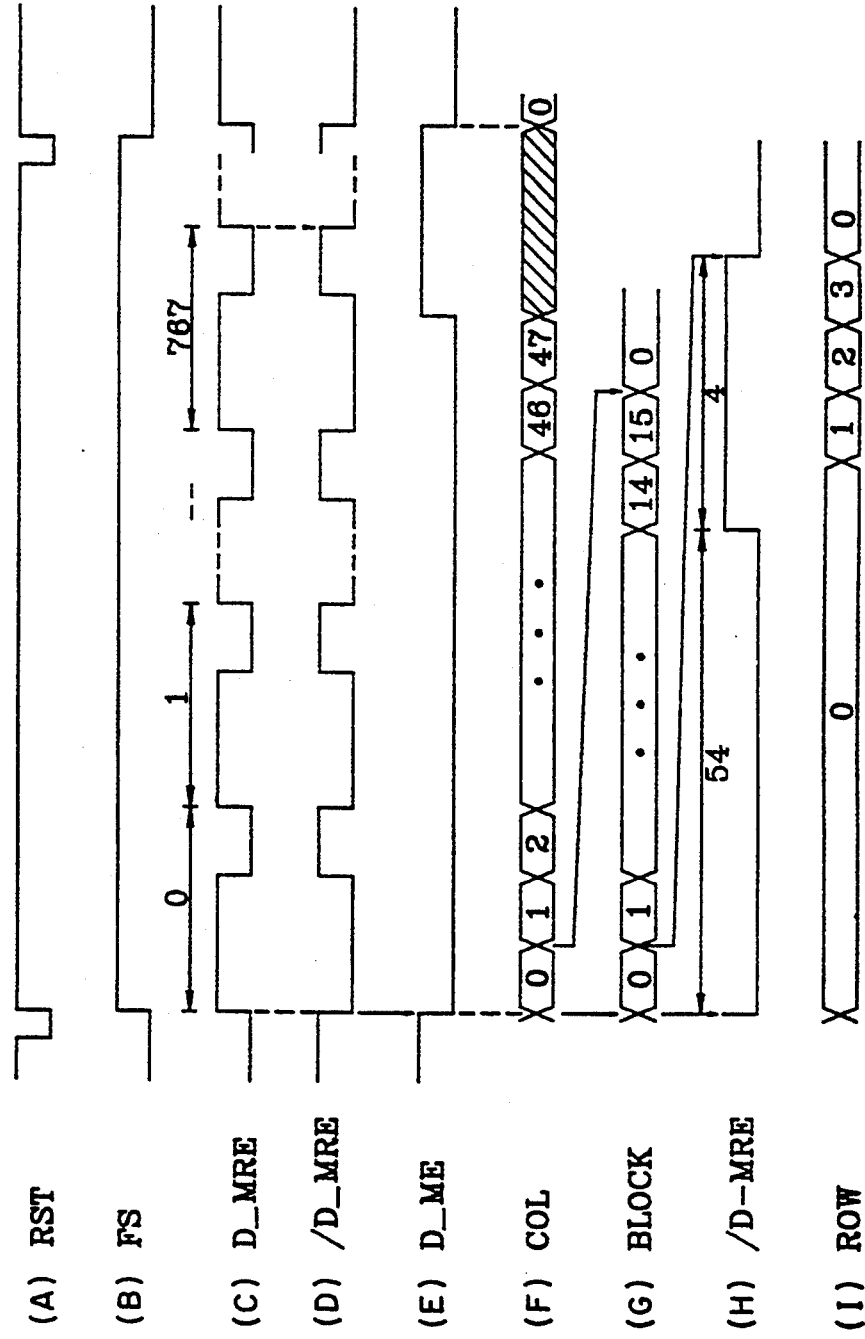
FIG. 42 is a timing chart of control signals when the additional information are read out from the decoding memory during the decoding operation.
Figure 43:
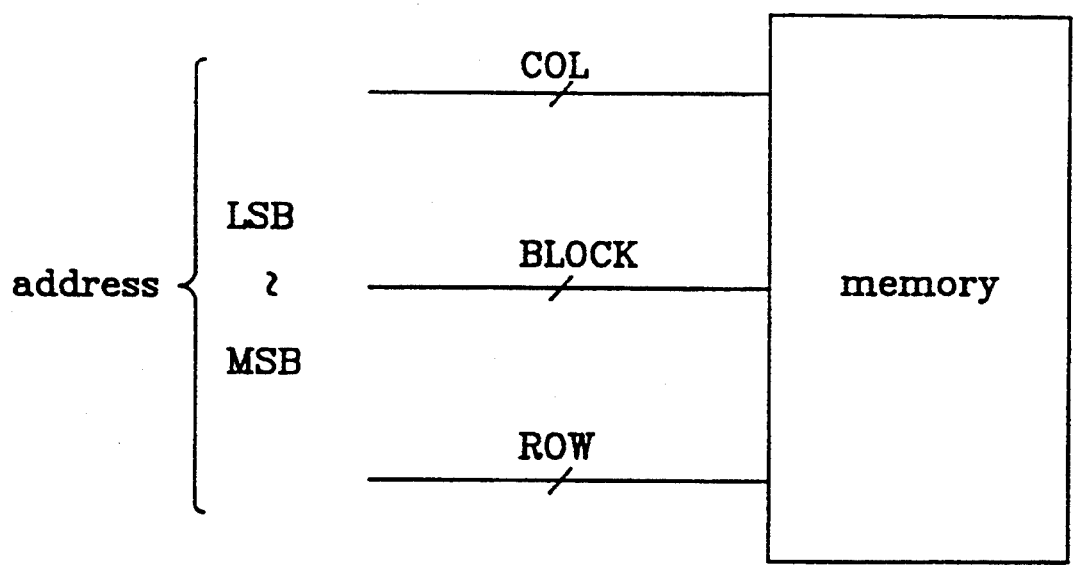
FIG. 43 is a diagram showing address signals to be applied to the memory.

FIG. 42 is a timing chart showing that the additional information data are read out from the decoding memory and FIG. 40 is a detailed circuit diagram of a read address generator 110 for generating an additional information read address as shown in FIG. 29.

When the additional information are read from the decoding memory, a row address generator 130 in FIG. 40 is first operated. In the row address generator 130, a row address is increased by "1" between "0" and "3". If the row address is counted to "3", then in a block address generator 131 a block address is increased by "1" between "0" and "15". If the block address is counted to "15" then in a column address generator 132 a column address is increased by "1" between "0" and "47". The operation of generating the address signals is repeated every frame.

As described above, image data are recorded on the recording medium 11 in data format as shown in FIG. 13, and the image data recorded in the medium 11 are reproduced in the original data format to be applied to the outer decoder 23 of FIG. 14.

The image data processing apparatus according to the present invention can correct burst and random errors using interleaving process and logic product coding process during reproducing operation of normal speed so that image degradation due to the errors can be prevented. Important data such as image information are recorded on middle portion of each track in a recording medium, and additional information not to be used during the reproducing operation at high speed and further additional information generated by inner encoding are recorded on upper and bottom portions of each track so that loss of the important information such as the image information can be largely prevented in image data not to be reproduced during a reproducing operation at high speed. It is the amount of image information corresponding to both of the additional information generated by the outer coding and the further additional information generated by inner coding which can be further reproduced, as compared with the conventional technique. Therefore, according to the present invention, image quality can be improved and loss of image information of 3,712 bytes can be prevented.

It is understood that various other modifications will be apparent to and can be readily made by those skilled in the art without departing from the scope and spirit of this invention. Accordingly, it is intended that the scope of the claims appended hereto not be limited to the description as set forth herein, but rather the claims are to be construed as encompassing all of the features of the present invention as are apparent to persons skilled in the art to which this invention pertains.

What is claimed is:

1. A method for recording digital image data which are compressed by a data compression logic comprising the steps:

receiving the digital image data corresponding to one frame;

converting the digital image data into a plurality of outer codes and a plurality of inner codes, each of the outer codes having an image information data block and a first additional information data block, and each of the inner codes having the image information data block and a second additional information data block;

generating a plurality of logic code blocks composed of the outer and inner codes, each of said logic code blocks being used as an error correction code block;

dividing each of the logic code blocks into a first storing information portion and a second storing information portion, said first storing information portion having the image information data block and the second additional information data block, and said second storing information portion having the first additional information data block and the second additional information data block; and recording the first storing information portion on a middle portion in each track on a recording tape and recording the second storing information portion only on top and bottom portions in each track.

2. The method according to claim 1 wherein in the step of converting the digital image data:

the first additional information data block is generated by an outer encoding and the second additional information data block is generated by an inner encoding.

3. An apparatus for recording and reproducing digital image data which are compressed by data compression logic comprising:

an analog to digital converter for converting an analog image signal into the digital image data;

a data compressor for compressing the digital image data to generate compressed data;

an outer encoder for encoding the compressed data to generate a plurality of outer codes, each of the outer codes having image information and first additional information to be tagged with the image information;

an encoding memory for storing the digital image data and first additional information of the outer codes in two frame memory portions thereof;

a first memory controller for controlling writing and reading operations of said encoding memory;

a synchronizing and identifying signal generator for generating synchronizing and identifying information as second additional information when information corresponding to one frame are provided from said encoding memory;

an inner encoder for encoding the information from the encoding memory for generating a plurality of inner codes and tagging each of the inner codes with the second additional information for recording the image information and the second additional information on a middle portion of each track of a recording tape and for recording the first and second additional information on top and bottom portions of each track of the recording tape;

an inner decoder for decoding information reproduced from the recording tape to generate reproduced data and an error flag corresponding to the reproduced data;

a demultiplexer for demultiplexing the reproduced data and the error flag supplied from said inner decoder;

an identifying data detector for detecting any identifying information in the reproduced data;

a decoding memory for storing both the reproduced data and the error flag in accordance with a logic level of the error flag;

a second memory controller for controlling writing and reading operations of said decoding memory;

an outer decoder for receiving the reproduced data and the error flag read out from said decoding memory under control of said second memory controller and decoding the reproduced data using the error flag for generating only the reproduced data as corrected data when there is no error in the data which can be corrected and for generating the reproduced data without correction and the error flag when there is an error;

a multiplexer for multiplexing information from said demultiplexer or information from said outer decoder in accordance with control of the second memory controller;

an error correction circuit, coupled to the demultiplexer, for correcting the multiplexed information from the multiplexer using the error flag to generate the corrected data; and a digital to analog converter for converting the corrected data into analog signal; and wherein the reproduced data and the error flag from said inner decoder are applied directly to said multiplexer through said demultiplexer during a reproducing operation of higher speed and applied to said multiplexer through said outer decoder during a reproducing operation of a lower speed.

* * * * *